(12) United States Patent
Farner et al.

(10) Patent No.: US 10,795,966 B1
(45) Date of Patent: *Oct. 6, 2020

(54) EXTRACTING DATA SETS FROM EXTERNAL DATA STORES

(71) Applicant: Quicken Loans, Detroit, MI (US)

(72) Inventors: Jay D. Farner, Bloomfield Hills, MI (US); Jasen Sams, Allen Park, MI (US); Peter Ritchie, Phoenix, AZ (US); Joe Guadagno, Mesa, AZ (US)

(73) Assignee: Quicken Loans, LLC, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/057,074

(22) Filed: Aug. 7, 2018

Related U.S. Application Data

(63) Continuation of application No. 15/709,233, filed on Sep. 19, 2017, now Pat. No. 10,042,949.

(60) Provisional application No. 62/396,615, filed on Sep. 19, 2016.

(51) Int. Cl.
*G06F 17/30* (2006.01)
*G06F 16/957* (2019.01)
*H04L 29/08* (2006.01)

(52) U.S. Cl.
CPC .......... *G06F 16/9574* (2019.01); *H04L 67/06* (2013.01); *H04L 67/1014* (2013.01); *H04L 67/1023* (2013.01); *H04L 67/2842* (2013.01); *H04L 67/02* (2013.01)

(58) Field of Classification Search
CPC .... G06F 17/30902; H04L 67/06; H04L 67/02
See application file for complete search history.

(56) References Cited

U.S. PATENT DOCUMENTS

| | | | |
|---|---|---|---|
| 9,298,574 B2 * | 3/2016 | Tanaka | G06F 11/3013 |
| 10,042,949 B1 | 8/2018 | Farner | |
| 2007/0209040 A1 * | 9/2007 | Alstad | H04L 63/12 |
| | | | 719/315 |
| 2012/0266073 A1 * | 10/2012 | Tanaka | G06F 11/3013 |
| | | | 715/736 |
| 2016/0192178 A1 * | 6/2016 | Blong | G06F 3/067 |
| | | | 455/418 |
| 2017/0208125 A1 * | 7/2017 | Jai | H04L 67/1097 |

OTHER PUBLICATIONS

Notice of Allowance dated Jan. 17, 2018 in related U.S. Appl. No. 15/709,233, 10 pgs.

* cited by examiner

*Primary Examiner* — Arvin Eskandarnia
(74) *Attorney, Agent, or Firm* — Kilpatrick Townsend & Stockton LLP

(57) ABSTRACT

A system for routing data requests may include internal systems that generate data requests to be routed to external data stores. The system may include a cloud computing platform that is configured to receive the data requests from the internal systems. For each data request, the system may determine a type associated with the data request, select a subset of the external data stores that are capable of fulfilling the data request based on the type of the data request, and select an external data store from the subset based on an identity of an internal system from which the data request was received and thresholds associated with the external data stores.

20 Claims, 16 Drawing Sheets

EXTRACTING DATA SETS FROM EXTERNAL DATA STORES

CROSS-REFERENCES TO RELATED APPLICATIONS

This application is a continuation of U.S. Non-Provisional application Ser. No. 15/709,233 filed on Sep. 19, 2017, which claims the benefit of U.S. Provisional Application No. 62/396,615 filed on Sep. 19, 2016, which is incorporated herein by reference.

TECHNICAL FIELD

This application discloses technology related to the fields of data processing, filtering, augmentation, and selection. Specifically, this application discloses technology solutions for selecting and extracting data from external data stores.

BACKGROUND

Data sets may be stored in any computing medium, such as a database, data store, enumeration, collection, and so forth. With the advent of the Internet and cloud computing, these data sets may be available for remote client devices to access and evaluate. These data sets may include any collection related sets of information that is composed of separate elements, but which can be manipulated as a unit by a computer system.

BRIEF SUMMARY

In some embodiments, a system for routing data requests from internal systems to external data stores may include a plurality of internal systems that generate a plurality of data requests to be routed to a plurality of external data stores, and a cloud computing platform comprising one or more processors. The cloud computing platform may be configured to receive the plurality of data requests from the plurality of internal systems. For each of the plurality of data requests received from the plurality of internal systems, the platform may also be configured to determine a type associated with the data request; select a subset of the plurality of external data stores that are capable of fulfilling the data request based at least in part on the type associated with the data request; and select an external data store from the subset of the plurality of external data stores. The external data store may be selected based at least in part on an identity of an internal system in the plurality of internal systems from which the data request was received, and one or more thresholds associated with the subset of the plurality of external data stores. The platform may also be configured to route an external request based on the data request to the external data store.

In some embodiments, a method for routing data requests from internal systems to external data stores may include receiving, at a cloud computing platform, a plurality of data requests from a plurality of internal systems. For each of the plurality of data requests received from the plurality of internal systems, the method may also include determining a type associated with the data request; selecting a subset of the plurality of external data stores that are capable of fulfilling the data request based at least in part on the type associated with the data request; and selecting an external data store from the subset of the plurality of external data stores. The external data store may be selected based at least in part on an identity of an internal system in the plurality of internal systems from which the data request was received, and one or more thresholds associated with the subset of the plurality of external data stores. The method may additionally include routing an external request based on the data request to the external data store.

In any embodiment, one or more of the following features may be included in any combination and without limitation. The cloud computing platform may include a first cache comprising external data previously received from the plurality of external data stores in response to data requests. The method may also include receiving a response comprising external data in response to the data request; generating a response based on the external data; sending the response to the internal system in the plurality of internal systems from which the data request is received; and storing the external data in the first cache. The method may additionally include receiving a second data request from one of the plurality of internal systems; determining whether the second data request can be serviced using the external data previously received in the first cache; and if the second data request can be serviced using the external data previously received in the first cache, generating a response based on the external data previously received in the first cache without sending a request to the plurality of external data stores. The cloud computing platform may also include a second cache comprising information used to build a request to the plurality of external data stores. The method may also include determining that the data request does not include all the information needed to generate the external request for the external data store; extracting an identifier from the data request; retrieving the information needed to generate the external request from the second cache using the identifier; and generating the external request using the information needed to generate the external request retrieved from the second cache. The method may further include determining that the data request includes all the information needed to generate the external request to the external data store; and sending the information needed to generate the external request to the second cache. The cloud computing platform may also include an API comprising one or more function calls that are associated with the subset of the plurality of external data stores that are capable of fulfilling the data request. The type associated with the data request may be determined based on the one or more function calls received through the API. The plurality of internal systems may include a Web server. Each of the plurality of external data stores may be operated on a computer system that located in a separate facility from the cloud computing platform and the plurality of internal systems, and wherein each of the plurality of external data stores is accessed by the cloud computing platform over the Internet. The one or more thresholds associated with the subset of the plurality of external data stores may include a target threshold for each of the subset of the plurality of external data stores defining a percentage of overall request traffic to be routed to each of the subset of the plurality of external data stores. Selecting an external data store from the subset of the plurality of external data stores may include determining that a current request traffic percentage for the external data store deviates more from its associated target threshold than others of the subset of the plurality of external data stores; and selecting the external data store that the current request traffic percentage for the external data store deviates more from its associated target threshold. The method may also include determining that a size of the plurality of data requests is exceed a threshold; and in response, resetting one or more characters that are used to select the external data store from the subset of the plurality of external data stores.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Described herein, are embodiments of a cloud system for receiving and processing client data. The cloud system may include an external data interface that can be used to contact third-party external data stores to extract information that may be useful in completing these processes. Information can be extracted from these external data stores that can be used to supplement the information received from the client device. This information can be provided manually by the client device, but can usually be provided faster and more accurately through the external data stores. Additionally, even when this information is provided by the client device, it may contain errors, omissions, and other inadvertent mistakes. Therefore, some embodiments can use information extracted from the external data stores to verify that the information provided from the client device is correct.

Figure 1:
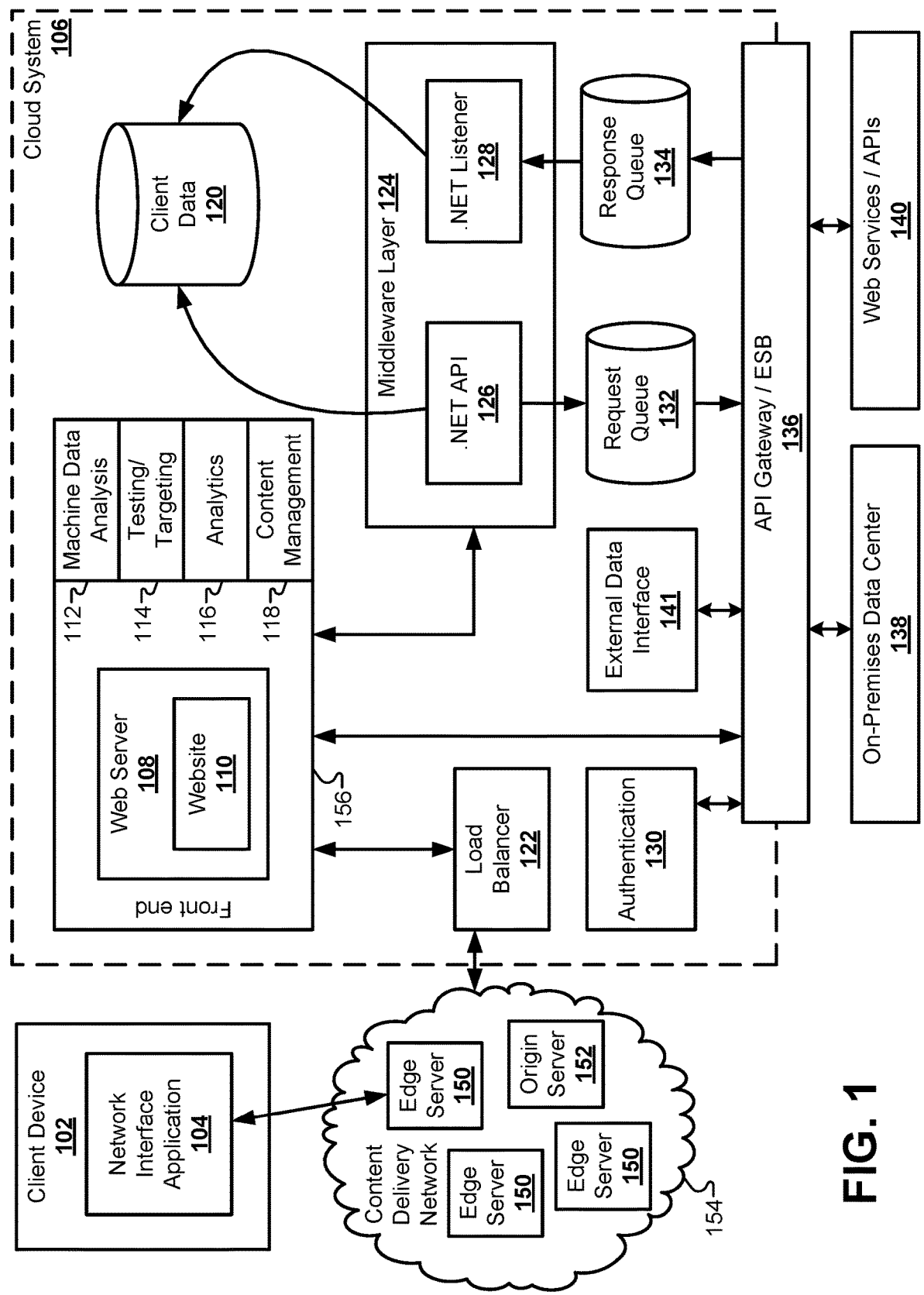
FIG. 1 illustrates a block diagram of a cloud system for receiving, importing, validating, and augmenting client data, according to some embodiments.

FIG. 1 illustrates a block diagram of a cloud system 106 for receiving, importing, validating, and augmenting client data, according to some embodiments. The client data collection process may begin with a client device 102 accessing the web server 108. The client device 102 may include a laptop computer, a desktop computer, a smart phone, a PDA, a tablet computer, a workstation, a voice-activated device or personal assistant, a watch, and/or the like. The client device 102 may be operated by a user to explore various data set options that may be available through the cloud system 106. The client device 102 may include a software application that acts as a network interface application 104 to parse and display data sent from the web server 108 and send information from the user. Depending on the particular hardware of the client device 102, the network interface application 104 may include a web browser operating on a desktop computer, an app operating on a smart phone, a voice recognition application operating on a control device, including the Google Home® or the Amazon Alexa®.

The client device 102 may communicate through a network, such as a local area network (LAN), a wide-area network (WAN), the Internet, and so forth. In the embodiment of FIG. 1, the cloud system 106 may provide content to the network interface application 104 via a content delivery network (CDN) 154. The CDN may include a plurality of edge servers 150 and at least one origin server 152 to store and distribute cached copies of the website 110 provided by the web server 108. The website 110 may include programming code, such as JavaScript, that provides front-end functionality to the website 110 when interacting with the client device 102. For example, the website 110 can collect client data that may be used to generate a result set by walking the user through a series of web forms. The client data may include information descriptive of the user, such as identification numbers. The website 110 can also use information supplied by the client device 102 to solicit information from third-party services through various APIs and/or web service interfaces. An example of a progression of web forms that collect information needed to recommend and/or approve a result set for the user is described in greater detail below. The client data may be provided in one or more data packets transmitted from the client device 102.

The CDN 154 can provide local copies of the website 110 to the client device 102 from an edge server 150 that is closer in proximity to the client device 102 than the web server 108 itself. One of the problems solved by the embodiments described herein involves the speed with which result sets can be provided and updated on the display of the client device 102. The architecture illustrated in FIG. 1 is specifically designed to increase the speed with which these results can be displayed on the client device 102 from a hardware perspective.

The website 110 is used only as an example of one of the ways that the cloud system 106 can interact with the client device 102. Therefore, this disclosure should not be limited to a website per se. Instead, the term website 110 throughout this disclosure may be replaced with any user interface capable of receiving data from the client device 102 and transmitting data to the client device. For example, another embodiment can provide a voice activated, audio interface for communicating with client devices through voice services such as Alexa® by Amazon®. Another embodiment can use an entertainment dashboard in a vehicle as an interface for communicating with the client device 102. Similarly, the web forms presented through the website 110 are also used as an example that is specific to the website 110 environment. In this disclosure, the term web form may be replaced with any sort of digital form that can present and receive information to a user through the network interface application 104. For example, the form could include interactive user interface elements displayed in an application running on a smart phone or smart watch. In another example, the form may include audio provided to a user and audio received from a user in a voice-activated user interface. Therefore, the terms "website" and "web form" are merely exemplary and not meant to be limiting.

The cloud system 106 may include a load balancer 122 that receives Internet traffic that may include client data provided from the client device 102. As used herein, the term "client data" may include any information received from the client device 102. For example, client data may include numerical values, data fields, estimates, identification numbers, addresses, user account identifiers, and so forth. As described in greater detail below, the client data received from the client device 102 may be augmented with information received from third-party web services and/or application programming interfaces (APIs). The client data may also be verified or validated using third-party validation interfaces that are external to the cloud system 106.

The cloud system 106 may include hardware elements that may be electrically coupled via a bus. The hardware elements may include one or more central processing units (CPUs), one or more input devices (e.g., a mouse, a keyboard, etc.), and one or more output devices (e.g., a display device, a printer, etc.). The cloud system 106 may also include one or more storage devices. By way of example, storage device(s) may be disk drives, optical storage devices, solid-state storage device such as a random access memory ("RAM") and/or a read-only memory ("ROM"), which can be programmable, flash-updateable and/or the like.

The cloud system may additionally include a computer-readable storage media reader, a communications system (e.g., a modem, a network card (wireless or wired), an infra-red communication device, etc.), and working memory, which may include RAM and ROM devices as described above. In some embodiments, the cloud system 106 may also include a processing acceleration unit, which can include a DSP, a special-purpose processor and/or the like.

The computer-readable storage media reader can further be connected to a computer-readable storage medium, together (and, optionally, in combination with storage device(s)) comprehensively representing remote, local, fixed, and/or removable storage devices plus storage media for temporarily and/or more permanently containing computer-readable information. The communications system may permit data to be exchanged with the network and/or any other computer described below with respect to the cloud system 106.

The cloud system 106 may also comprise software elements, shown as being currently located within a working memory, including an operating system and/or other code, such as an application program (which may be a client application, web browser, mid-tier application, RDBMS, etc.). It should be appreciated that alternate embodiments of a cloud system 106 may have numerous variations from that described above. For example, customized hardware might also be used and/or particular elements might be implemented in hardware, software (including portable software, such as applets), or both. Further, connection to other computing devices such as network input/output devices may be employed. Software of cloud system 106 may include code for implementing various embodiments as described herein.

The Web server 108 may be part of a front end 156 posted by the cloud system 106. The front end 156 may additionally include other hardware and/or software components that quantify the performance of the Web server 108. Some embodiments may include a content management system (CMS) 118 to support the creation and/or modification of digital content that is presented by the Web server 108 to the client device 102. Some embodiments may include an analytics component 116, such as a customer experience management (CEM) system that captures and analyzes the details of the experience of the user of the client device 102. Some embodiments may include a testing and targeting component 114 used to target specific users with specific content. Some embodiments may also include a machine data analysis component 112 that searches, monitors, and analyzes machine-generated big data via a web interface by capturing/indexing/correlating real-time data in a searchable repository to generate reports, graphs, and other visualizations. These components 112, 114, 116, 118 can be used by the cloud system 106 to analyze the effectiveness of the content provided by the website 110 over time.

The cloud system 106 may also include a middleware layer 124 that acts as an interface between the front end 156 and other data systems in the cloud system 106. The middleware layer 124 may perform application integration, data integration, and handle messages passed back and forth between the cloud system 106 and an on-premises data center 138 and other external systems. In the embodiment of FIG. 1, the middleware layer 124 may include an API 126 and a listener 128 for generating and receiving responses from various systems. For example, the middleware layer 124 can communicate with a client data database 120 that securely stores client data received from the client device 102. The client data database 120 can be used in conjunction with other off-cloud databases to store client data between web sessions for a particular user. The middleware layer 124 can also interface with a request queue 132 and a response queue 134 of the cloud system 106. The request queue 132 can store messages passed from the middleware layer 124 to other systems both inside and outside the cloud system 106. Similarly, the response queue 134 can receive messages passed from other systems to the middleware layer 124.

Some of the external systems that interface with the cloud system 106 may include the on-premises data center 138 and one or more Web services and/or APIs 140. To interface with these external systems, the cloud system 106 may include an API Gateway or Enterprise Service Bus (ESB) to provide a central point for managing, monitoring, and accessing exposed Web services. Data can be passed from the middleware layer 124 to the API Gateway/ESB 136 through the request queue 132 and/or the response queue 134. Additionally, the front end 156 may communicate directly with the API Gateway/ESB 136.

To collect the client data from the client device 102, the website 110 may present a series of dynamic web forms to the network interface application 104. Before, during, and/or after this process of collecting client data begins, the cloud system 106 may require the user to establish a user account with the cloud system 106. Some embodiments may include an authentication module 130 that authenticates an identity of a user of the client device 102. The authentication module 130 may communicate with the data center 138 through the API Gateway/ESB 136.

The presentation of web forms may include a type of web form that allows the client device 102 to submit data provided by the user. The web form can receive data from the user that may require some form of verification before it is used in the selection of a data set or the generation of a result set. Prior to this disclosure, such data verification could take days or even weeks to perform. This generally discouraged users from completing the web session and generating a client data packet. To solve this and other problems, the embodiments described herein may use an external data interface 141 to verify the client data provided from the client device 102. The external data interface 141 may, for example, retrieve a history of data values from other computer systems that can be used to generate an estimate of certain fields in the web form provided by the user. For example, the external data interface 141 may provide a verified value to the cloud system 106, and the data provided from the client device 102 may be verified if that data falls within a predetermined range of the verified value. This data verification step allows for greater accuracy and reliability when selecting candidate data sets and generating result sets for the client device 102.

The external data interface 141 may also retrieve data that can be used to supplement and/or correct information provided from the client device 102. Depending on the complexity of the web session, some users may be unwilling to manually enter all of the client data requested by the website 110. Other users may enter incorrect information accidentally or purposefully. The external data interface 141 provides an alternative to previous systems that required the user to manually provide all current data through the client device 102. Instead, the external data interface 141 can select at least a portion of the current data provided to the web form to automatically download a portion of the current data from the external data interface 141. For example, instead of manually typing current data values into the web form, the cloud system 106 can instead use a user identifier and/or user credentials to download a portion of the current data automatically through the external data interface 141. This process can decrease the amount of time required for the user to progress through the plurality of web forms, and can reduce user-injected errors into the client data. Information may be imported from the external data interface 141 as data packets. The external data interface 141 may access a third-party computer system that provides the imported data. After the client data is collected from the client device 102 and optionally supplemented/verified by data from the external data interface, the system can use the client data to generate a solution that includes one or more result sets.

Figure 2A:
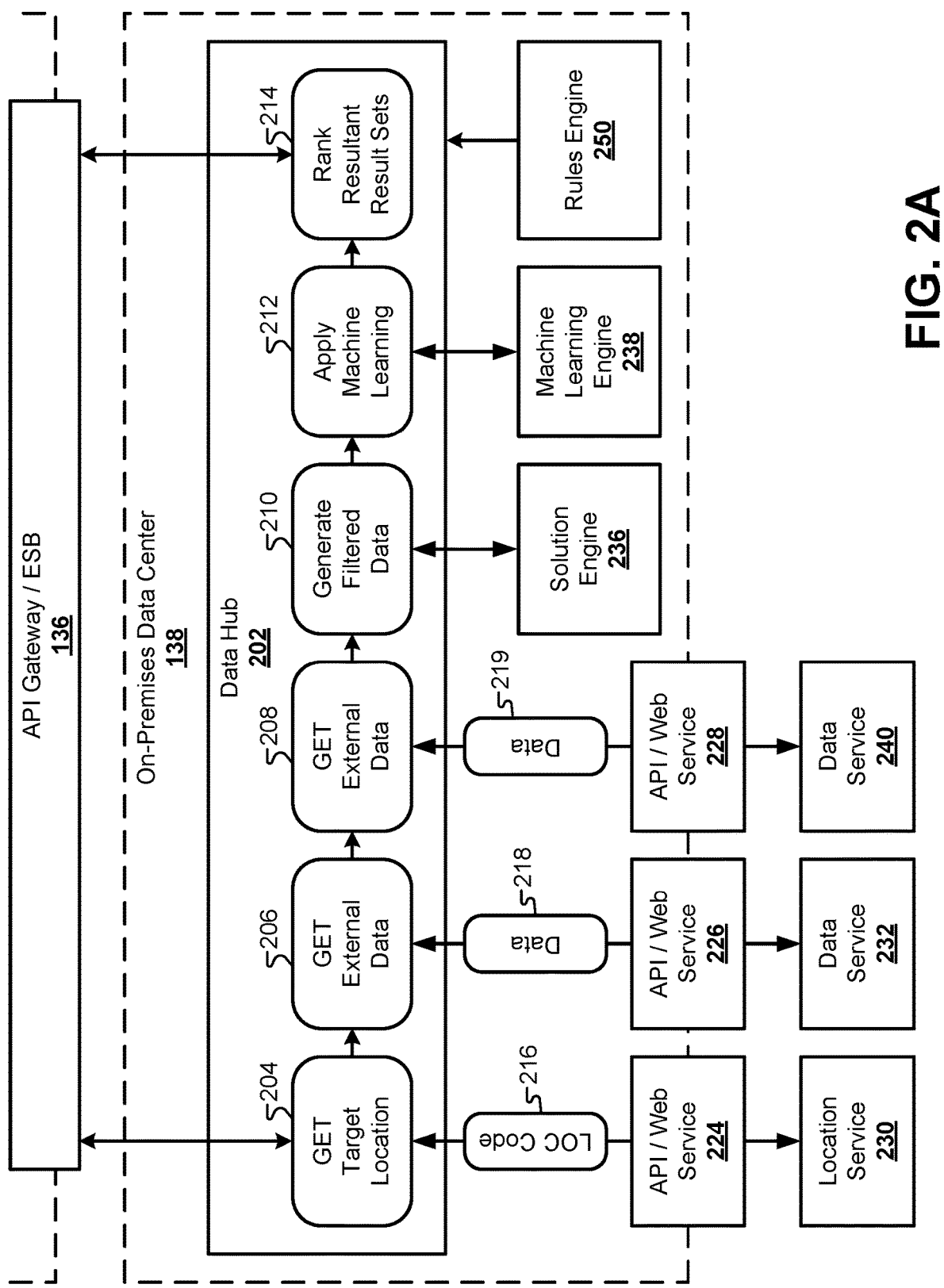
FIG. 2A illustrates a block diagram of a data center that may be used in conjunction with the cloud system, according to some embodiments.
Figure 2B:
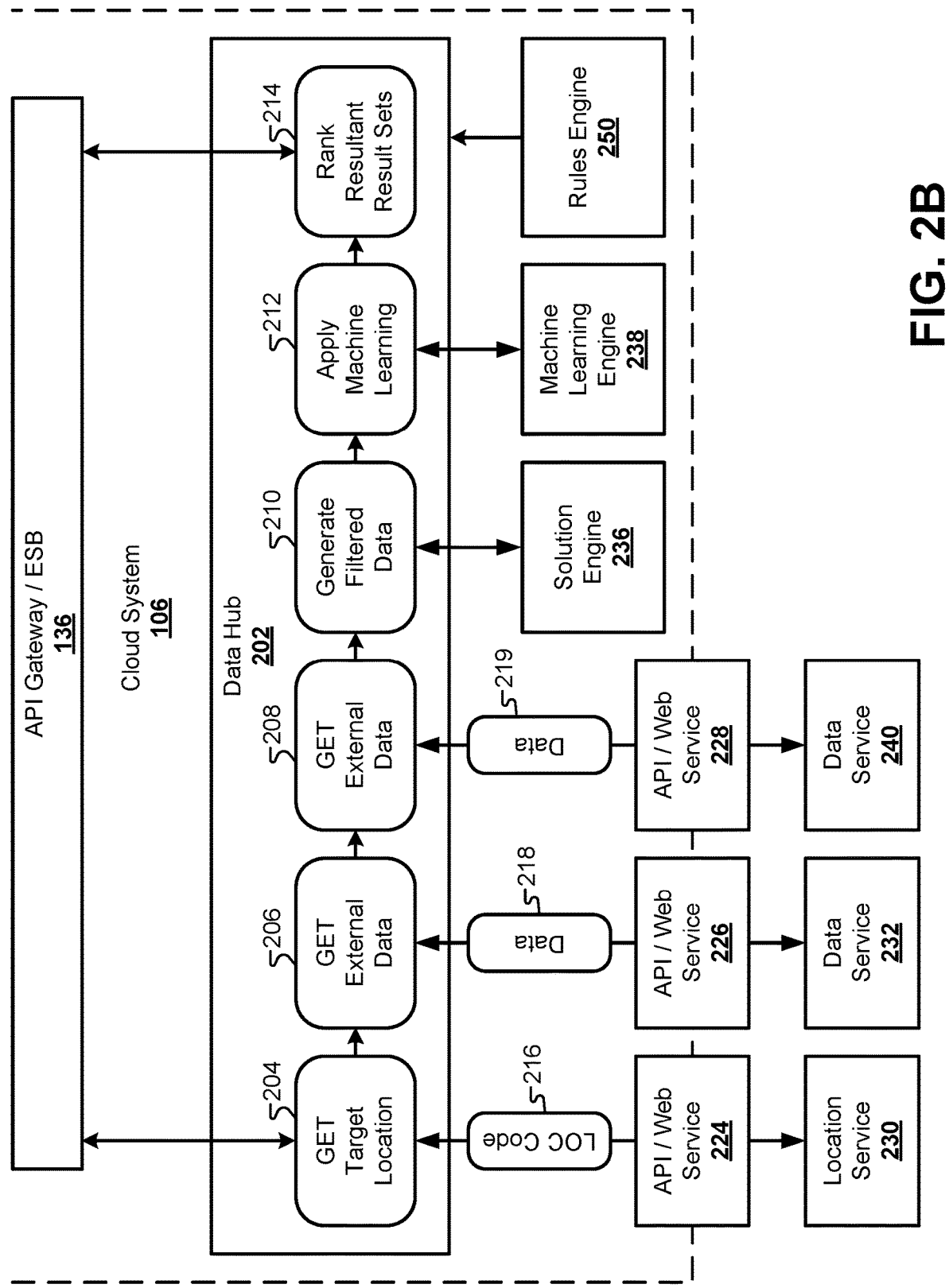
FIG. 2B illustrates an architecture where the software/hardware components from the data center are instead located in the cloud system.

FIG. 2A illustrates a block diagram of a data center 138 that may be used in conjunction with the cloud system 106, according to some embodiments. In this embodiment, the cloud system 106 may be separate from the data center 138. For example, the data center 138 may be physically hosted by an entity that generates the result sets to the client device 102, while the cloud system 106 may be hosted by a cloud service provider that is different from the entity providing the data center 138. However, in other embodiments, the functionality provided by the data center 138 may also be located in the cloud system 106. Some embodiments may duplicate the functions described below for the data center 138 in both the cloud system 106 and the data center 138. Therefore, the bifurcation of the system between FIG. 1 and FIG. 2A is done by way of example and not meant to be limiting. Other embodiments may divide the functionality described herein between the cloud system 106 and the data center 138 in any combination of functions without limitation. For example, FIG. 2B illustrates an architecture where the software/hardware components from the data center 138 are instead located in the cloud system 106.

The data center may include various databases that store client data, along with systems that provide content for the cloud system 106. To generate solutions based on the received client data, the data center 138 may include a data hub 202 that receives a packet of client data from the cloud system 106 and generates one or more result sets that are transmitted back to the cloud system 106. The data hub 202 may act as a central aggregator of the client data that finalizes the client data packet for generating a solution. Specifically, the data hub 202 may be made up of a plurality of processes that augment, format, filter, and process the client data in such a way that a solution engine 236 and a machine learning engine 238 can generate an optimal result set.

In some embodiments, the data hub 202 can augment the client data by executing a process 204 that requests a location code 216 from a location service 230 through an API/web service 224. The location code may designate a general geographic area to be associated with the client data. The data hub 202 may also include a process 206 that uses the location code retrieved from the location service 230 to retrieve rules or penalties 218 that may be applied to the candidate data sets based on location. The process 206 can send the location code through an API/web service 226 to a data service 232 specifically configured to provide such rules or penalties 218 for candidate data sets. These may include a cost that is applied to the data set based on the location from the location service 230. In some embodiments, a process 208 may retrieve additional data 219 from a data service 240 through an API/web service 228. The data 219 received from the data service 240 may include a rating for the user that may influence which particular candidate data sets that may be available to the user. The data service 240 may include a third-party service that provides a rating for the user that is based at least in part in some of the values provided in the client data from the user, as well as a previous history of the user.

After augmenting the client data, the data hub 202 can include a process 210 to generate a set of filtered data. As used herein, the term filtered data may refer to a specific subset of the augmented client data that is formatted for submission to the solution engine 236. The filtered data can be used by the solution engine 236 to filter out candidate data sets from a collection of available data sets that are not available to the user. For example, at this stage, the client data may include an exhaustive list of information that may be needed later by the system in future web sessions. However, much of the client data may not be needed at this stage of the process for filtering the collection of available data sets. Therefore, the process 210 can select a subset of the information in the client data, format the filtered data accordingly, and send the formatted subset of the client data to the solution engine 236. In response, the solution engine can provide a plurality of candidate data sets from the collection of available data sets for consideration by the data hub 202.

Next, the data hub 202 can select one or more optimal data sets from the plurality of candidate data sets through a process 212 that accesses a machine learning engine 238. The machine learning engine 238 can use additional information from the filtered and/or client data. For example, the solution engine 236 may provide a plurality of data sets that are available to the user based on the filtered client data. The machine learning engine 238 can select an optimal subset of the available data sets to be transmitted back to the client device 102. A process 214 can then rank the result sets by type and send the result sets to the cloud system 106 for transmission to the client device 102.

The data hub 138 may govern the overall process of collecting the client data, determining which, if any, portions of the client data are missing or invalid, and calling upon external services to augment the client data with additional information. For each field in the client data, a rules engine 250 can execute a validation rule to ensure that the client data is valid (e.g., "is the value of the rate field greater than 0.00?"). The rules engine 250 can also determine which external data services may be used to retrieve data that is missing from the client data packet. For example, a rating from an external rating service may be required before candidate data sets can be selected. If the rules engine 250 determines that the client data set is missing this rating, it can cause the process flow of the data hub 202 to make a request to the external rating service to retrieve a rating for the user. Overall, the rules engine 250 can orchestrate the process flow of the different processes 204, 206, 208, 210, 212, 214, etc., in the data hub 202.

Figure 3:
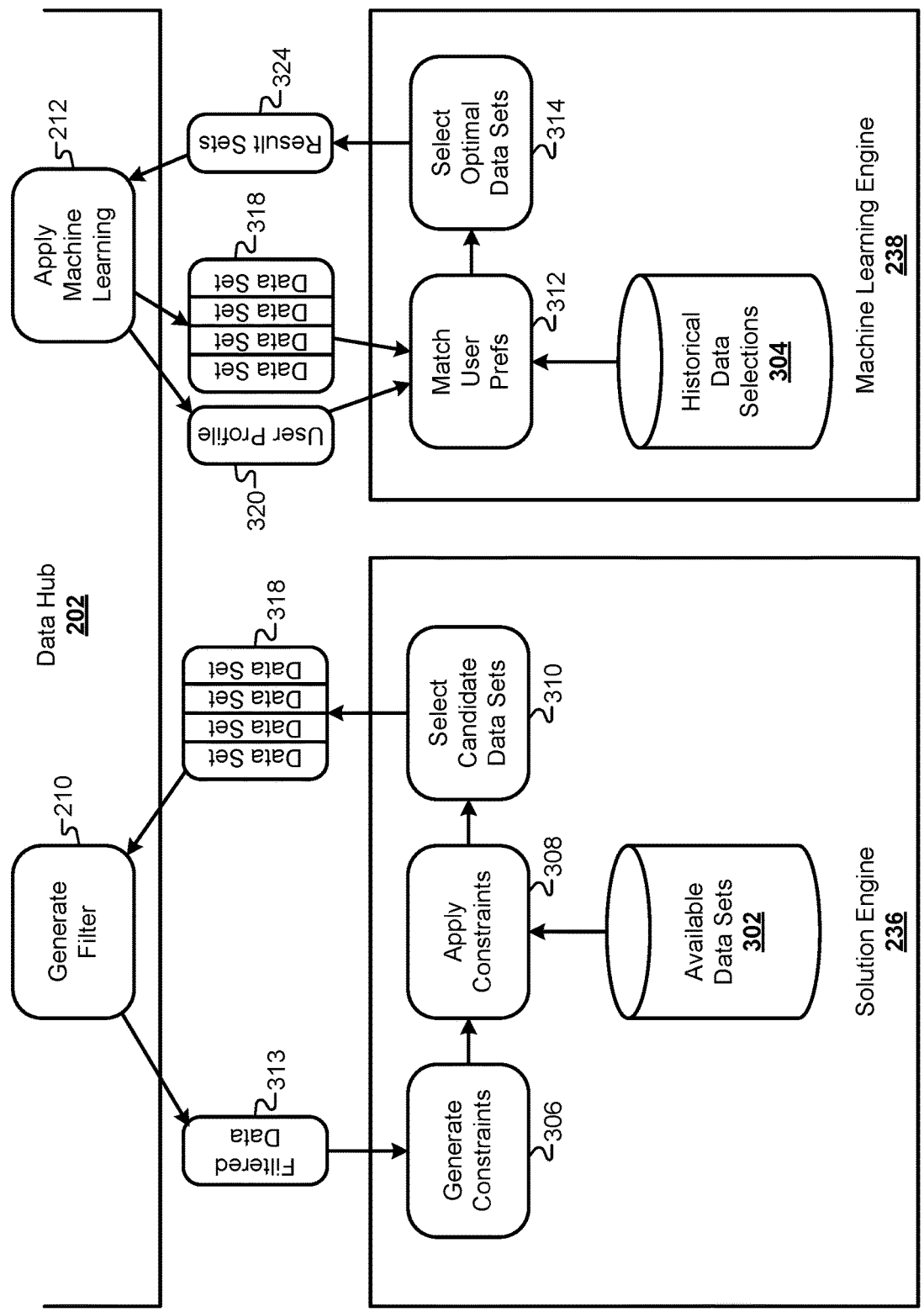
FIG. 3 illustrates a block diagram of how the solution engine and the machine learning engine generate result sets, according to some embodiments.

FIG. 3 illustrates a block diagram of how the solution engine 236 and the machine learning engine 238 generate result sets 324, according to some embodiments. The filtered data 313 can be passed to the solution engine 236, and process 306 can use the filtered data 313 to generate a plurality of rules and subsequent constraints to be applied to the available data sets. As described in greater detail below, the process 306 can use fields in the filtered data 313 to eliminate subsets of the available data sets, which can be expressed in constraints statements. For example, a determined data type may be used to eliminate certain data sets from the collection of available data sets. In some embodiments, the collection of available result sets may be categorized according to a type that may correspond to the data type in the filtered data 313. One or more constraint expressions may be constructed by the process 306 that would eliminate available data sets associated with that particular data type from the collection of available data sets for this particular set of filtered data 313.

After generating the constraints, the solution engine 236 can execute a process 308 that applies the constraint statements to the collection of available data sets. The collection of available data sets may be stored in a database 302, and may include thousands of different data set options. Data sets may be categorized based on a time interval, a rate, a source, and so forth. Data sets may also be categorized based on eligibility of the user based on augmented client data. In some embodiments, the constraint expressions can be applied in a single pass to each individual available data set; however, other embodiments may apply constraint expressions in multiple passes through the available data set. After the constraints are applied, a linear regression method 310 can be used to generate a set of candidate data sets 318. These candidate data sets may represent data sets for which the user may be eligible.

Next, the candidate data sets 318 can be provided to the machine learning engine 238. The machine learning engine can analyze the candidate data sets 318 and select one or more optimal data sets 314 from the candidate data sets 308. The machine learning engine 238 can use a collection of historical data selections 304 to determine the optimal data set(s) 314. For example, the client data provided by the user may be used to generate a user profile. The machine learning engine 238 can compare the user profile for this particular user to user profiles for previous web sessions associated with different users. The data set selections of previous users can then be used to determine which of the candidate data sets 318 would most likely be chosen by the current user.

For example, after each web session, the machine learning engine 238 can store the optimal data sets presented to each user, along with which of the optimal data sets was selected by each user in the collection of historical data selections 304. Additionally, the machine learning engine 238 can store the user profile derived from the augmented client data for each user with the selection information. When a new plurality of candidate data sets 318 is received for a new user, the augmented client data can be used to generate a similar user profile. For example, a set of values can be extracted from the augmented client data to generate a user profile 320. The user profile 320 can be matched to one or more historical user profiles. The final selections made by the users associated with the matched historical profiles can then be used to influence the selections made from the candidate data sets 318 for the current user. For example, if a number of previous users all selected certain types of optimal data sets that were presented, the previously selected optimal data sets can be ranked higher, based on this prior selection data. In essence, the machine learning engine 238 may use the expressed preferences of previous users to determine which of the candidate/optimal data sets are most likely to be selected by the current user.

Figure 4:
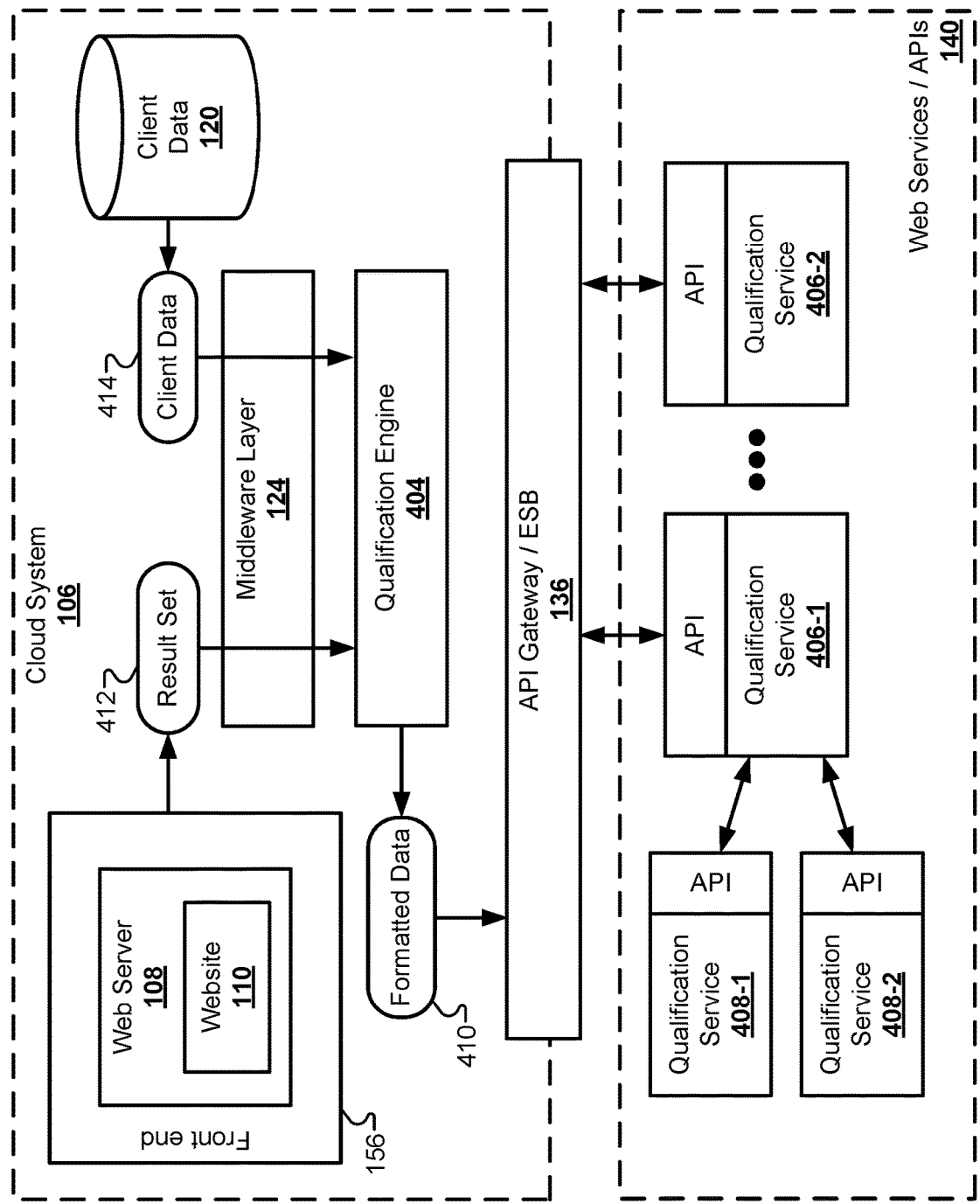
FIG. 4 illustrates a block diagram of the cloud system interacting with a plurality of qualification services, according to some embodiments.

FIG. 4 illustrates a block diagram of the cloud system 106 interacting with a plurality of qualification services 406, according to some embodiments. After the user has finalized the result set by adjusting values in the result set 324 through the web interface, the finalized result set 412 can be sent to a universal qualification engine 404 of the cloud system 106. The finalized result set 412 may include final values for the adjustable parameters that are set by the user, such as a final value for a rate field, a final value for a cost or penalty field, a final value for a time interval field, and so forth. Additionally, the client data that was collected, imported, augmented, and validated during the process described above may be stored in the client data database 120. The client data 414 may also be provided to the qualification engine 404.

After receiving the finalized rule set 412 and the client data 414, the qualification engine 404 can filter and/or combine data fields from the finalized result set 412 and the client data 414 to put together specific data packages that are required by each of the qualification services 406. Each qualification service 406 may require certain data points from the finalized result set 412 and/or the client data 414, and the qualification engine 404 can assemble data packages that match the requirements of each particular qualification service 406. Additionally, each qualification service 406 may require that each data packet be formatted according to specific requirements, such as a specific XML file format. The qualification engine 404 can format each data package according to the requirements of each particular qualification service 406.

Through the API Gateway/ESB 136, the qualification engine 404 can send data packages to one or more of a plurality of qualification services 406. Some qualification services 406 may be communicated with directly by the cloud system through a corresponding public API or web service interface. Secondary qualification services 408 may be accessible through another qualification service 406-1. In these cases, the data package can be formatted and selected based on the requirements of the qualification service 406-1, and a field or designator may be provided indicating that the qualification service 406-1 should send the request to a specific secondary qualification service, such as qualification service 408-2.

In some cases, each qualification service 406 may impose a penalty or cost on each submitted request. Therefore, it may be advantageous for the cloud system 106 to intelligently determine an order of precedence or ranking for the qualification services 406. When a plurality of qualification services are available, the cloud system 106 can rank each of the qualification services based on the criteria discussed below, then sequentially send requests to each of the qualification services 406 until an acceptable result has been returned. In some embodiments, the request may be sent simultaneously to each of the qualification services 406 without regard for a specific penalty for each. Instead, the system can analyze the results from each of the qualification services 406 to determine which of the results is most advantageous.

Figure 5:
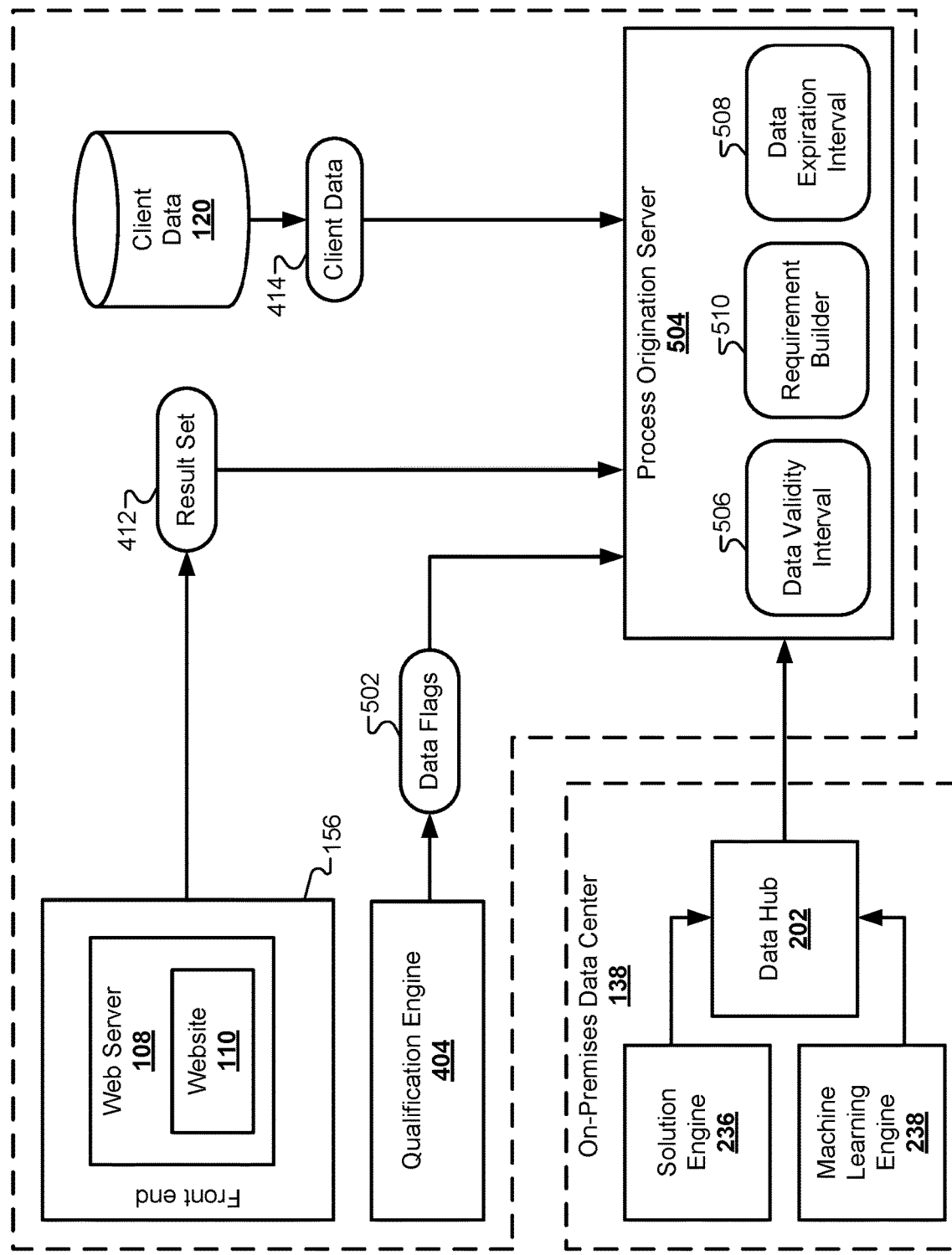
FIG. 5 illustrates a block diagram of the different system components that contribute to locking the finalized result set as valid data, according to some embodiments.

FIG. 5 illustrates a block diagram of the different system components that contribute to locking the finalized result set 412 as valid data, according to some embodiments. A process origination server 504 may reside either in the cloud system 106 or in the on-premises data center 138. This particular configuration illustrates the process origination server 504 in the cloud system 106. The process origination server may be configured to orchestrate a process by which the user can make use of the finalized result set 412 to complete other processes and transactions. For example, the process origination server 504 may automatically generate one or more documents that may be required for the user to complete other processes. The process origination server 504 may collect the required inputs submitted during a data expiration interval. The process origination server 504 may also interface with other third-party systems to import additional data and/or validate additional data submitted as part of an ongoing process that uses the finalized result set during a validity interval.

The process origination server 504 may include a data validity interval process 506 that manages the data validity interval. The data validity interval process 506 may determine an initial length of the data validity interval. The length of the data validity interval may be influenced by a number of factors from a number of different components in the system. In some embodiments, the data validity interval may be influenced by the client data 414. For example, the client data 414 may include a user preference indicating a desired length of the data validity interval.

The process origination server 504 may also include a data expiration interval process 508 that can calculate and monitor the length and progress made during the data expiration interval. Like the length of the data validity interval, the length of the data expiration interval may be determined by a number of different factors. In some embodiments, the length of the data expiration interval may be set to a default value (e.g. 8 days). In some embodiments, this default value may be overridden or influenced by other factors. In one example, client data 414 that has been imported and/or validated by a third-party import and/or validation service may increase or decrease the length of the data expiration interval. The data flags 502 returned from the qualification engine 404 may specifically indicate that the data imported and/or validated have been accepted by the qualification services 406, and may thus also influence the length of the data expiration interval 508.

The process origination server 504 may also include a requirement builder 510. The requirement builder may be configured to construct a customized set of required inputs that need to be received during the data expiration interval to prevent automatic expiration of the locked data. In some embodiments, the set of required inputs may include documentation (e.g., PDFs, emails, verifications, etc.) that must be submitted from the client device 102 to the process origination server 504. A baseline set of required inputs may be applied to each finalized result set 412 unless other factors cause the required inputs to change. In some embodiments, the set of required inputs may be determined by the optimal data set returned by the data hub 202, such that each of the available data sets is associated with a corresponding set of required inputs.

In some embodiments, the set of required inputs may be determined by the data flags 502 return from the qualification engine 404. The data flags 502 may include one or more flags that indicate required inputs that may be required by the qualification services 406. In some embodiments, the set of required inputs may be reduced and/or increased based on the data flags 502. For example, the data flags 502 may indicate that at least a portion of the client data 414 has been imported and/or validated by third-party import and/or validation services. The qualification services 406 may accept the imported and/or validated client data without requiring any additional inputs associated therewith. Therefore, the data flags 502 may eliminate some documentation or other inputs that may otherwise be required during the data expiration interval 508. The set of required inputs may also be influenced by the location code in the client data 414, some of the data values in the client data 414, and/or the data set received from the data hub 202. For example, the optimal data set received from the data 202 may be associated with a corresponding set of required inputs.

As described briefly above in relation to FIG. 1, the cloud system 106 may include an external data interface 141 that can be used to contact third-party external data stores to extract information that may be useful in completing these processes. Information can be extracted from these external data stores that can be used to supplement the information received from the client device. This information can be provided manually by the client device, but can usually be provided faster and more accurately through the external data stores. Additionally, even when this information is provided by the client device, it may contain errors, omissions, and other inadvertent mistakes. Therefore, some embodiments can use information extracted from the external data stores to verify that the information provided from the client device is correct.

Figure 6:
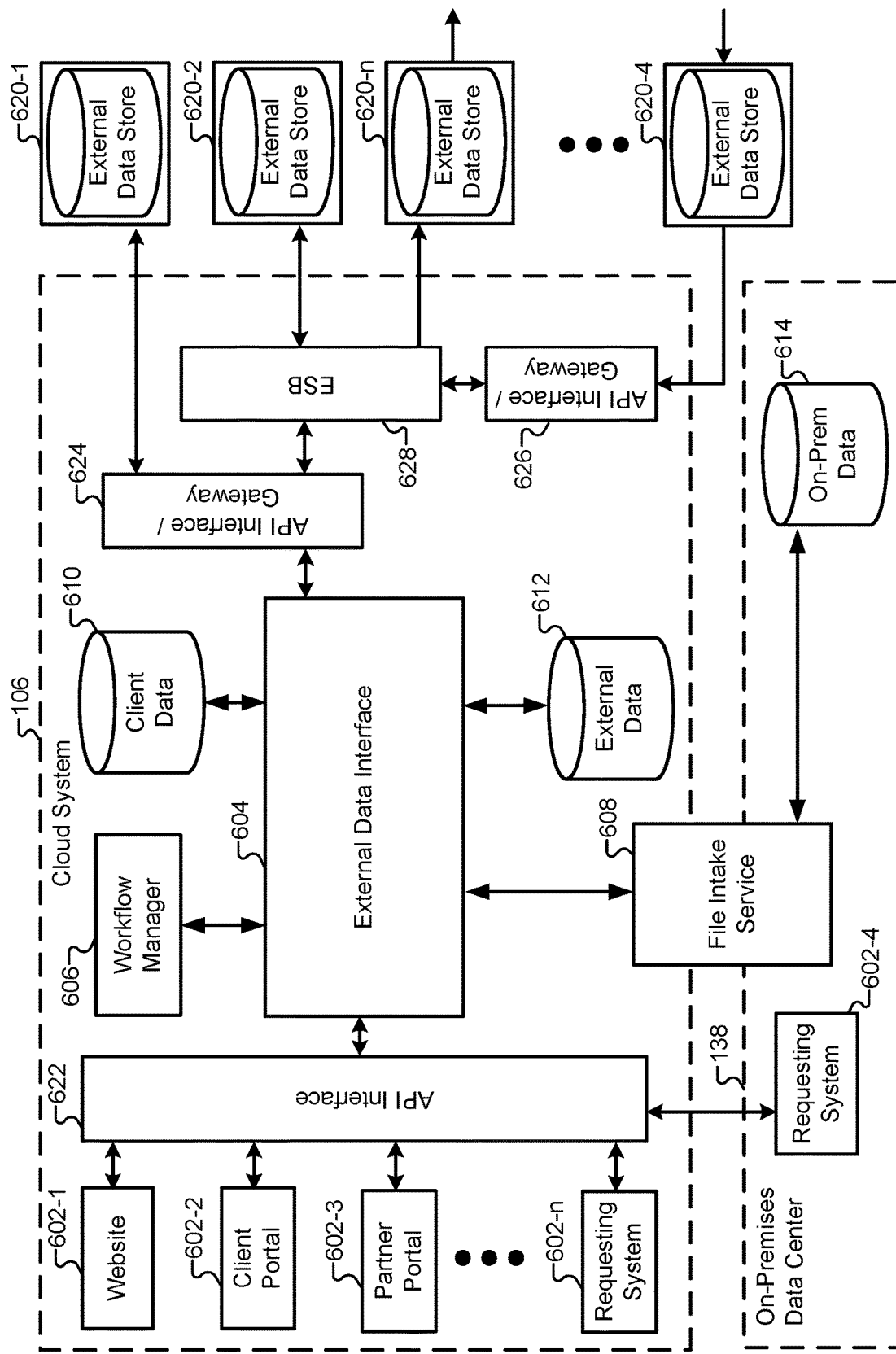
FIG. 6 illustrates an external data interface in the cloud system that can be used for extracting information from external data stores, according to some embodiments.

FIG. 6 illustrates an external data interface 604 in the cloud system 106 that can be used for extracting information from external data stores, according to some embodiments. As described above, the cloud system 106 may include a website 602-1. The website 602-1 can be used to initially collect information from the client device to begin the process described above. However, the website 602-1 may be just one of a plurality of possible requesting systems 602. These requesting systems 602 may include a client portal 602-2 allows client devices to access and edit their data sets after the process described above in FIGS. 1-5 to generate a final result set has been completed. The requesting systems 602 may also include a partner portal 602-3 that is a partner-facing web application used to feed client data to other systems. Some of the requesting systems 602 may be part of the same cloud system 106 as the external data interface 604. Alternatively or additionally, some of the requesting systems 602 may be part of the on-premises data center 138, such as requesting system 602-4. In other embodiments not explicitly shown in FIG. 6, some requesting systems 602 may also reside in other computing locations.

Together, the requesting systems 602 may be referred to herein as "internal" systems, in that they are internal to the cloud system 106 and/or the on-premises data center 138. This terminology can be used to differentiate the internal systems from the "external" data stores 620 that are being accessed. In some embodiments, the internal systems may all be operated by the same entity, whereas the external data stores 620 may each be operated by different entities. The internal systems also may be used for editing or collecting client device data from the client device for the process described above in FIGS. 1-5, whereas the external systems are used to supplement or verify information provided by the client device.

An API interface 622 may also be provided in the cloud system 106 to both identify and filter the requesting systems 602 (the internal systems) making requests, and to provide a uniform interface for each type of call that may be made to one of the external data stores 620. The API interface 622 can whitelist and/or blacklist any systems making a request. In some embodiments, each of the requesting systems 602 can be included on a whitelist such that no external systems can make calls through the API interface 622. In some embodiments, the API interface 622 can standardize the format for requests made to any external data store 620 using, for example, a REST interface. For example, POST or GET commands received through the API interface 622 can be used to extract data sets for single client identifiers, as well as batches of multiple data sets for multiple client identifiers.

In other embodiments, the API interface 622 may include a specified format for each subset of external data stores 620 that provide similar functions, provide similar services, and/or store similar data. For example, external data stores 620-1, 620-2 may each similarly provide a certain type of data that can be used to supplement client data in the same way. One function of the external data interface 604 and the API interface 622 is to abstract the details of selecting between all of the external data stores 620 to find the right subset of external data stores that can service the request from the client device, as well as selecting one of the subset of external data stores that can optimally service the request. Therefore, the API interface 622 may include standardized interfaces (e.g., POST/GET) for accessing similar types of data. When a command is received through the API interface 622, the external data interface 604 can determine the subset of external data stores 620 that are capable of servicing the request by virtue of the type of call received through the API interface 622. Each call that is specific to a subset of the external data stores may include parameters that are needed to access the corresponding subset of external data stores 620.

As will be described below in detail, the external data interface 604 can receive requests from the API interface 622 and proceed to check a localized cache for previous results, build a full request using stored client device data, select a single external data store from the identified subset of external data stores, and package the request in a format specific to the selected external data store. The cloud system 106 may include a client data store 610 that includes information received from the client devices, such as identification information that can be used to uniquely identify the user of the client device, and which can be used by the external data interface 604 to complete otherwise incomplete requests received through the API interface 622. The cloud system 106 may also include a database for external data 612 that has been previously extracted from the external data stores 620. The database for external data 612 can be used to service requests to the external data interface 604 without making an additional call to the external data stores 620 in certain situations described below.

After results are received from the external data stores 620, the external data interface 604 can store and analyze these data for future processes. A file intake service 608 may have portions that reside both in the cloud system 106 and in the on-premises data center 138. The file intake service 608 can receive data and documentation from the external data stores 620 and encrypt and transfer them to an on premises data store 614. The external data interface 604 can also perform certain evaluations to analyze the data received from the external data stores 620. In some cases, this analysis may verify information previously provided from the requesting systems 602 or augment the client data with information that has not yet been provided from the requesting systems 602. These evaluations may interface with a workflow manager 606 to both add and remove tasks specific to a particular client data set.

It will be appreciated that each of the external data stores 620 may include a web service interface or other standard API that includes formats or parameters that are very specific to each individual external data store 620. Therefore, before sending a request, the cloud system 106 may need to perform extensive formatting and repackaging of a request received through the API interface 622 before it is sent to the external data stores 620. One of the benefits provided by the system described herein is that the API interface 622 provides a standardized and stable interface for each of the requesting system 602 to make requests. As the web service interfaces of each of the external data stores 620 change over time, the external data interface 604 can be changed centrally to match the interfaces of the external data stores such that the requesting systems 602 are isolated from these changes. Put another way, the external data interface 604 and its surrounding APIs abstract the details of interfacing directly with the external data stores 620 from each of the requesting systems 602. Furthermore, when multiple external data stores 620 offer similar services, the external data interface 604 can abstract the process of determining which subset of the external data stores 620 are capable of servicing the request, as well as selecting one of the subset of external data stores 620 for servicing a particular request.

The process of formatting and packaging a request for the external data stores can be distributed between the external data interface 604, an API interface/gateway 624, and an Enterprise Service Bus (ESB) 628. The external data interface 604 may use a high-level programming language, such as C # or C++. Complex mappings between the data received from the API interface 622 and the required formats of the external data stores 620 can be performed in the external data interface 604, such as initially populating the request data fields and performing data transformations. Other lower-level mappings can be performed in the ESB 628, such as simple conversions between standardized formats (e.g., XML, and JSON). The ESB 628 can also provide a second layer of security by whitelisting/blacklisting systems such that only the external data interface 604 and other approved systems can make calls through the ESB 628 to the external data stores 620.

Another API interface/gateway 626 can be used for synchronous calls to external data stores 620. For example, each external data store 620 may have different session characteristics, including a session timeout interval. For some external data stores 620-4 that require a longer session (e.g., 90 seconds) to service requests, the API interface/gateway 626 can handle the timing and handshakes between the external data store 620-4 and the cloud system 106. For example, the external data store 620-4 may interface with another external system and act as a middleman between the external system and the cloud system 106. This may require a longer session interval while the external data store 620-4 interacts with the external system.

Figure 7:
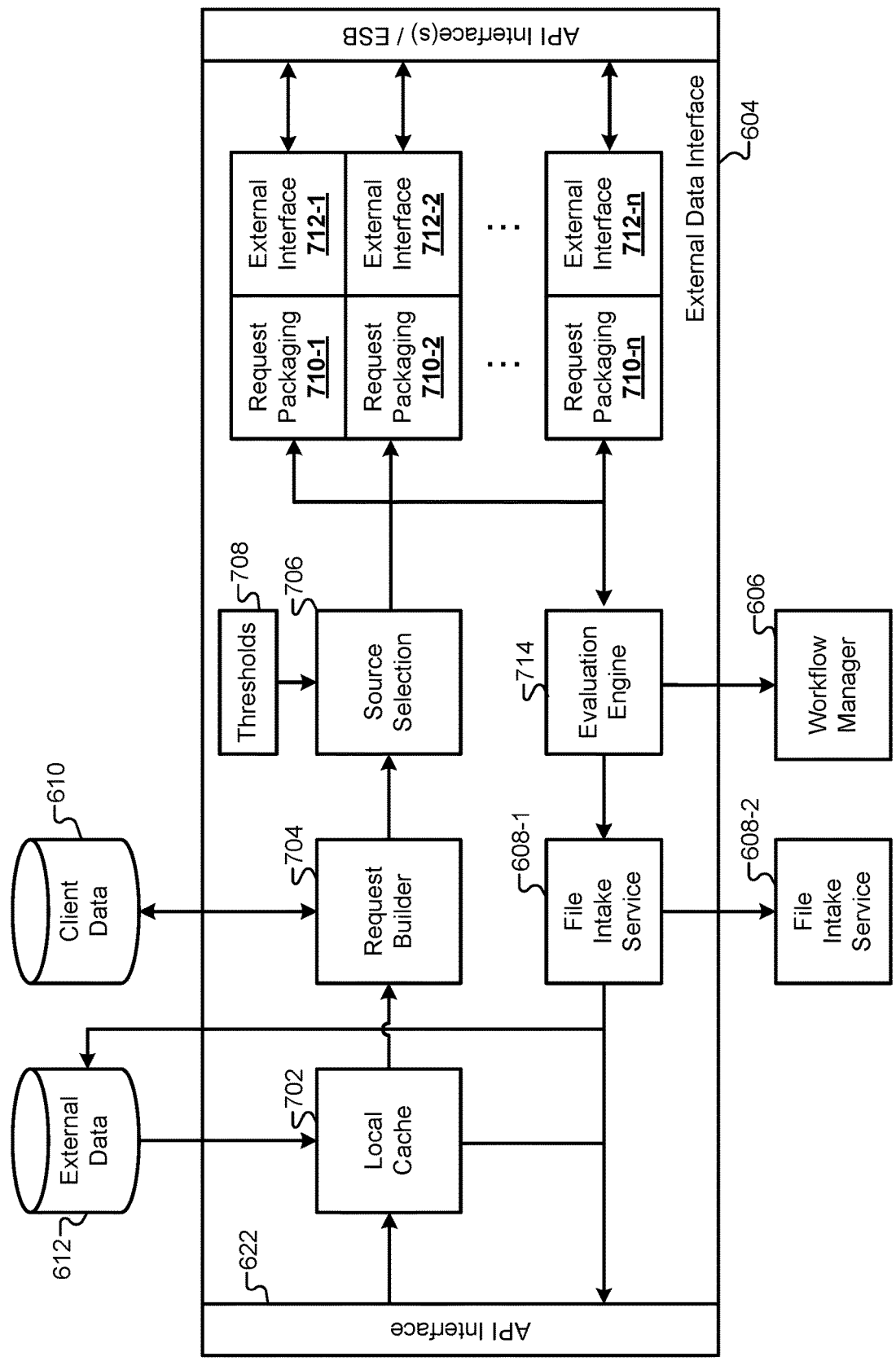
FIG. 7 illustrates a simplified block diagram of the external data interface, according to some embodiments.

FIG. 7 illustrates a simplified block diagram of the external data interface 604, according to some embodiments. Some of the subsystems of the external data interface 604 will be described in detail below in FIGS. 8-10. After receiving the request through the API interface 622, the external data interface 604 can determine a type for the request. The type may be determined based on a particular call made through the API interface 622. For example, functions performed by the external data interface 604 may be associated with particular calls through the API interface 622. The external data interface 604 can receive a call and look up a subset of external data stores 620 that are capable of servicing the particular request type. Note that multiple calls may be made through the API interface 622 for the same subset of external data stores 620, such as both a GET and a POST call for a single functionality to service single and batch requests, respectively.

After receiving the request, and before accessing any of the external data stores 620, the external data interface 604 can execute a local cache function 702 that checks the database of external data 612 to determine whether the request can be serviced locally. The database of external data 612 can store data previously received from the plurality of external data stores 620. This can be useful for servicing duplicate requests where the resulting data sets have been recently retrieved from the plurality of external data stores 620.

If the local cache process 702 determines that a call needs to be made to the external data stores 620, the request can be forwarded to a request builder 704. The request builder can determine whether the information provided in the request is sufficient for the selected external data store to service the request. If additional information is needed, the request builder 704 can access the client data data store 610 to retrieve information that has previously been provided by the client device. This allows the request made through the API interface 622 to be fairly simple, providing, for example, only a client identifier when the actual requests made to the external data stores require a more substantial set of client data to service the request.

A source selection process 706 can take the identified subset of the plurality of external data stores 620 that are capable of servicing a request type, and select a single external data store to service this particular request. A stored set of thresholds 708 that can be dynamically updated in real-time can be used by the source selection process 706 to balance the manner in which requests are funneled between the plurality of external data stores 620.

As described above, once a single external data store is selected, it may require very specific formatting according to its exposed web interface. For each of the plurality of external data stores 620, the external data interface may include a specific request packaging function 710 and external interface 712. The request packaging function 710 can perform the high-level repackaging of the request received from the request builder 704 to match the format and data fields required by the selected external data store. The external interface 712 can then handle the interaction between the external data interface 604 and the selected external data store. One advantage provided by this system is that when the public interfaces of the external data stores change, the only changes that need to be made to the cloud system 106 can be isolated to the request packaging functions 710 and the external interfaces 712. Therefore, these changes and external-system-specific details can be abstracted from the rest of the cloud system 106.

The external interfaces 712 can handle all of the interactions with the external data stores 620, including initiating a session, handling the communication protocol, enforcing security requirements, and monitoring the individual timeout intervals. Each of these functions may be very specific to the particular external interface 712. After receiving a resulting data set from the external data stores, the request packaging functions 710 can translate any results received into a common format for the cloud system 106. Again, this ensures a stable data interface for any requesting system while abstracting the specific formatting details of the external data stores 620. The request packaging functions 710 can generate a standardized response with a payload that may be specific to each subset of external data stores (or request type). Thus, any requesting system 602 making a particular function call through the API interface 622 can receive a standardized response regardless of which of the plurality of external data stores 620 actually services the request.

Before being forwarded to the requesting system, the formatted response can be evaluated by an evaluation engine 714. For example, the data received from the external data store may be used to verify fields provided from the client device. The evaluation engine 714 can compare fields received from the client device to corresponding fields in the formatted response to determine whether the fields received from the client device can be verified. Some embodiments may use stored thresholds or other metrics in that comparison. For example, if a value provided by the client device is within 5%, 10%, 50%, 20%, etc., of the corresponding value provided from the external data store, then the value in the field provided by the client device can be verified. In another example, a value provided from the external data stores 620 can be analyzed without requiring comparisons to data received from the client device. Some external data stores may provide a score or metric for a user of the client device. This score can then be compared to predetermined score thresholds to determine whether certain actions need to be taken by the user of the client device, or whether the user of the client device is eligible for certain workflow options. The evaluation engine 714 can use the evaluation results to interface with the workflow manager 606. For example, if values provided from the client device can be verified using corresponding values received from the external data stores, then certain tasks can be eliminated from a client workflow in the workflow manager 606. Conversely, if these values cannot be verified, then the evaluation engine 714 can add tasks to the workflow, such as requiring additional and/or manual verification of these values.

Some embodiments may include a file intake service 608. The file intake service may include a first component 608-1 that is resident in the external data interface 604 and/or the cloud system 106, as well as a second component 608-2 that is resident on the data center 138. Some external data stores may provide documentation that can be used later to document and/or prove the data received from the external data stores 620. These documents are generally not needed in the external data interface 604 to service future requests, but may be required to complete the process described above in FIGS. 1-5, an may require secure storage. Therefore, the first component 608-1 can transfer documents and/or data to the second component 608-2 in the data center 138 to be encrypted and securely stored. In some embodiments, the first component 608-1 can generate a message that is sent to the second component 608-2 indicating that new data and/or documents are available. The second component 608-2 can then pull documents and/or documents from the first component 608-1, perform any necessary document format conversion, encrypt the results, and store them securely in the on-premises data store 614. Note that the second component 608-2 can pull documents from the first component 608-1 using batch requests or at a later time after the request is serviced. The second component 608-2 can also subscribe to messages or events produced by the first component 608-1.

The data retrieved from the external data stores 620 can then be returned in a response having a standardized format for the request type through the API interface 622. In some embodiments, results of the evaluation engine 714 can also be included in the response. For example, some responses can include a flag or indication denoting whether the data provided by the client device was verified by the data provided from the external data stores 620.

Figure 8:
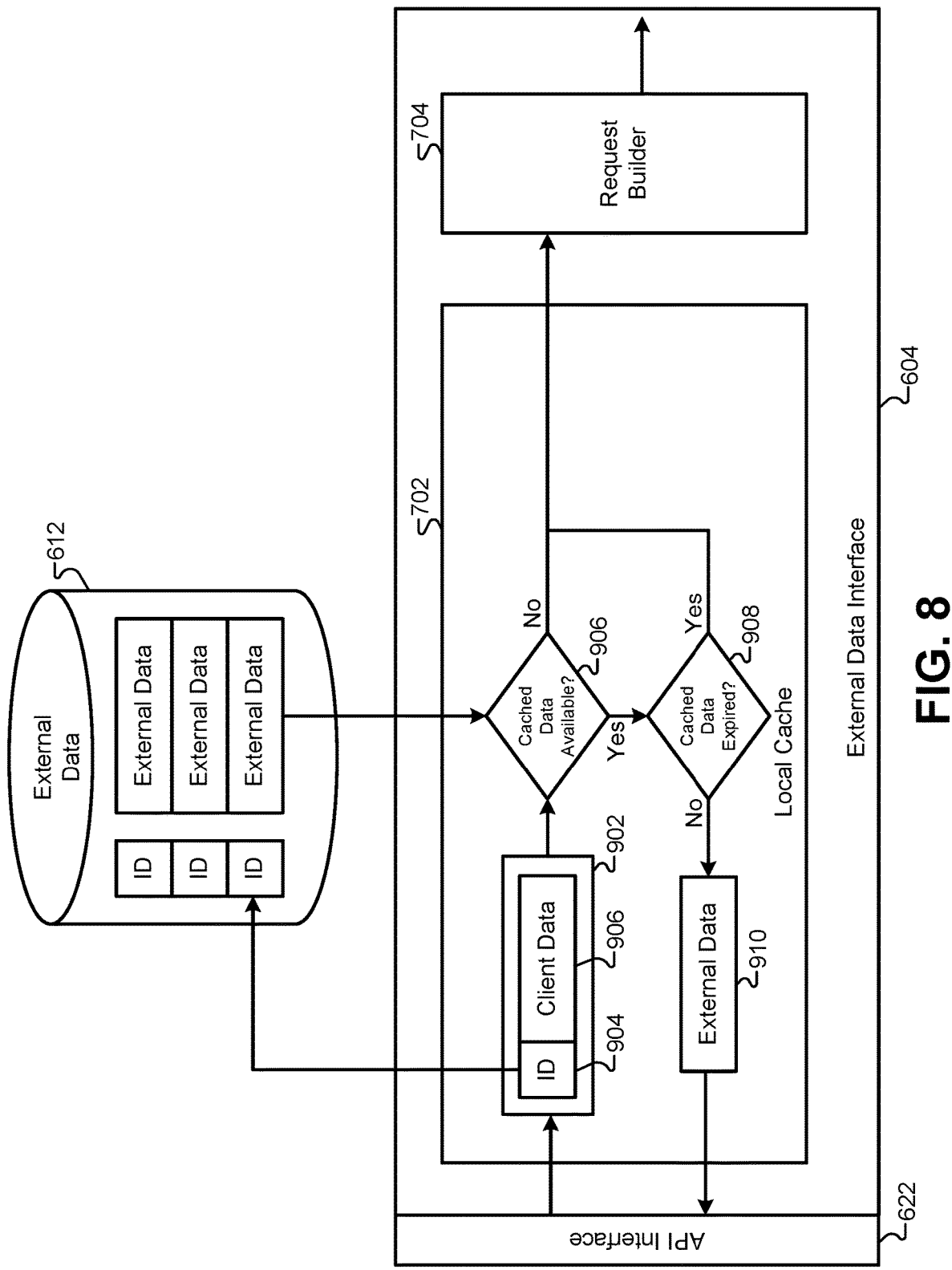
FIG. 8 illustrates a diagram of the functionality of the local cache process, according to some embodiments.

FIG. 8 illustrates a diagram of the functionality of the local cache process 702, according to some embodiments. The local cache process 702 can receive a request from the API interface 622. Before forwarding the request on to the request builder 704, the local cache process 702 can determine whether a new call to the external data stores 620 is even necessary. Many workflows involving data received from the client device may be as long as one week, two weeks, 30 days, 45 days, 60 days, and so forth. During the time interval that the workflow is active, the same data may be requested from the plurality of external data stores 620 multiple times. The local cache process 702 has access to the database of external data 612 described above. Before forwarding a new request, the local cache process 702 can determine whether data stored in the database of external data 612 is available and/or recent enough to respond to the request without accessing the external data stores 620.

In some embodiments, a request 902 may include an identifier 904 that uniquely identifies a client device or user of the client device. The request 902 may also include a payload of client data 906. The client data 906 may include any type of additional information received from the client device in the processes described above. The local cache process 702 can use the identifier 904 in the request 902 to access the database of external data 612. The database of external data 612 can return a corresponding set of external data that was previously retrieved for the corresponding identifier 904. In some embodiments, the local cache process 702 can send both the identifier 904 and the type for the request to the database of external data 612. The database of external data 612 may store multiple sets of external data for each identifier, with each of the multiple sets of external data being received from different external data stores 620. The type of request can be used to determine which set of external data associated with the identifier 904 should be retrieved.

The local cache process 702 can then determine whether cached data was available in the database of external data 612. If no data was available (e.g., if this is the first request for this type of data, or if results of a previous request have been overwritten in the database of external data 612), then the request can be forwarded on to the request builder 704 for continued processing. If cached data is available from the database of external data 612, then the local cache process 702 can determine whether the cached data has expired. Each request type may be associated with a specific expiration interval. For example, requests of the first type may have an expiration interval of 30 days, while requests of a second type may have an expiration interval of one week. The local cache process 702 can compare a timestamp of the external data received from the database of external data 612 to an expiration interval specific to that request type to determine whether the external data is expired. If the external data is available but expired, then the request can be forwarded to the request builder 704 for continued processing. If the external data is available and unexpired, then the external data 910 can be provided as a response through the API interface 622. When the external data 910 can be provided, the results can appear to be immediate from the perspective of the requesting system. This process significantly decreases the response latency and increase of the available bandwidth of the external data interface 604 to process additional requests. This process also reduces the amount of processing power used by the additional processes in the external data interface, such as the request builder 704 and the source selection process 706.

Figure 9:
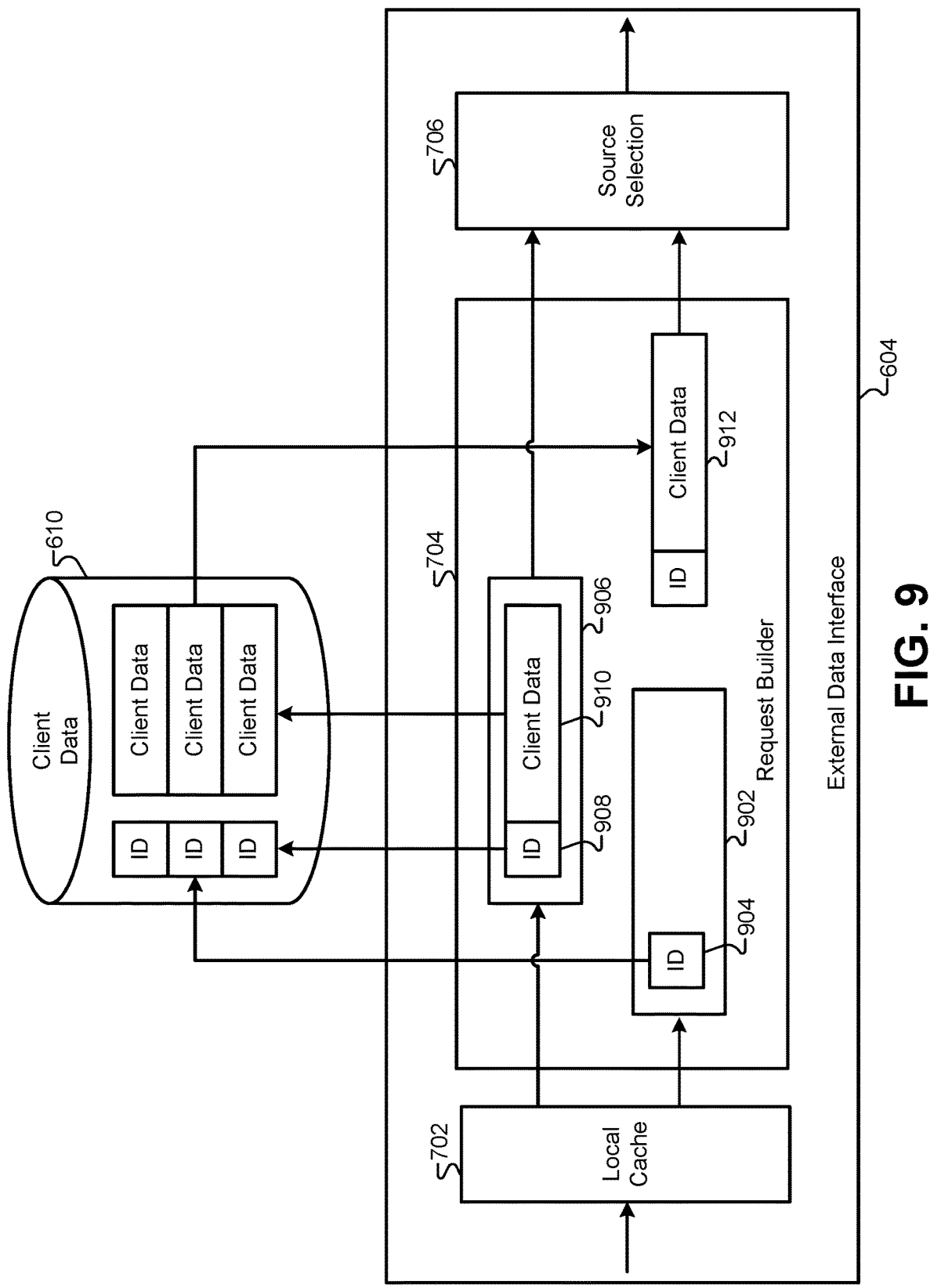
FIG. 9 illustrates a diagram of the functionality of the request builder, according to some embodiments.

FIG. 9 illustrates a diagram of the functionality of the request builder 704, according to some embodiments. The request builder 704 can significantly reduce the complexity of the requests made by the requesting systems. Specifically, the request builder 704 can reduce the amount of information required to be transmitted from the requesting systems 602, thereby increasing the bandwidth of the external data interface 604 to handle additional requests. This also reduces the number of erroneous requests that include errors and omissions in the required parameters. Reducing these errors reduces the processing time required by the external data interface 604 to handle a large number of requests simultaneously.

FIG. 9 illustrates two different examples of how request can be handled. A first request 906 may be a complete request, including an identifier 908 and a payload of client data 910. The client data may include personal identification information, and other information received from the client device in the process described above for FIGS. 1-5. The request builder 704 may determine that this is a first request using this identifier 908, or may determine that the client data 910 in the request 906 is sufficient to build the request. Consequently, the request builder 704 can send the identifier 908 and the client data 910 to the client data database 610 in the cloud system 106. This stores a local copy of the client data 910 for use in servicing future requests. In some embodiments, request 906 can be handled differently. Specifically, the request builder 704 can determine that all of the information needed for the request is available in the client data 910. At this point, the request 906 can be forwarded to the source selection process 706 without sending any information to the client data database 610. Instead, the client data database 610 can be populated with the client data as it is received from the client device as described above. In either case, the request builder 704 can extract the necessary information from the client data 910 and build a request to be forwarded to the source selection function 706.

In a second example, a request 902 can be received from the requesting system, where the request 902 includes at least in identifier 904, but need not include all of the client data needed to properly package the request for the corresponding external data store. In this example, the request builder 704 can send the identifier 904 to the client data database 610 can retrieve the corresponding client data 912. The retrieved client data 912 and the identifier 904 can then be packaged for the request and sent to the source selection process 706 for continued processing. In some embodiments, the request 902 is not necessarily "incomplete" from the perspective of the requesting system. The API 622 may expose interface calls that only require a minimal amount of information, such as an identifier. These calls may then rely on the client data database 610 to fill in any information that is not provided by the requesting system, but which is required by the external data store.

It should be noted that the client data database 610 may store extensive client data received from the client device. In many cases, only a small subset of the client data stored in the client data database 610 may be required to build the request for the external data store. Therefore, the request builder 704 can make a call to the client data database 610 for only information that is relevant to a particular external data store. The request builder 704 can use the type of the request and/or the selected external data stored to determine what information needs to be retrieved from the client data database 610.

Figure 10:
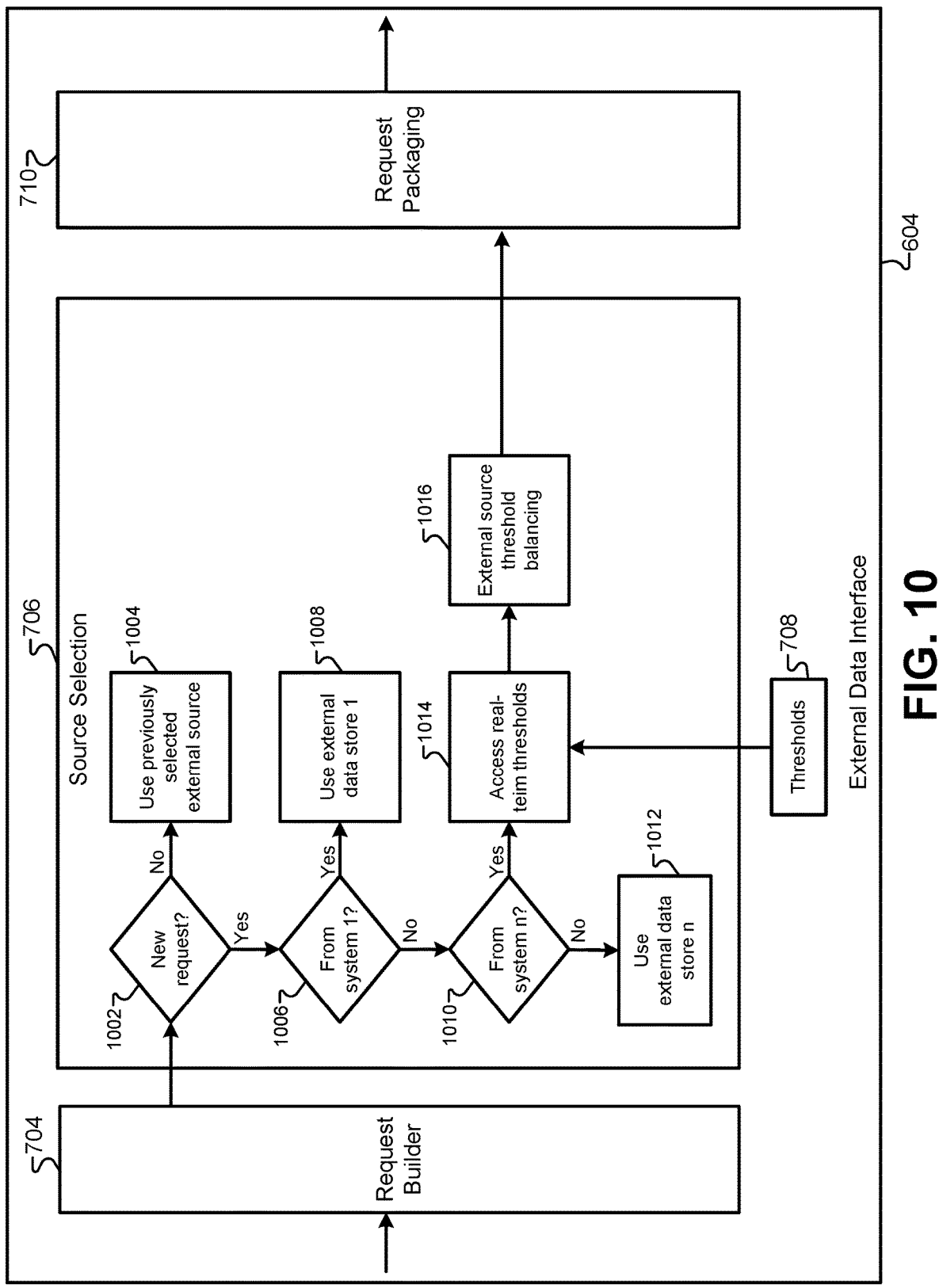
FIG. 10 illustrates a diagram of the functionality of the source selection process, according to some embodiments.

FIG. 10 illustrates a diagram of the functionality of the source selection process 706, according to some embodiments. As described above, each particular type of request corresponding to one or more function calls in the API 622 can be capable of being serviced by a subset of the plurality of external data stores. For example, in a system that connects to ten different external data stores, three of the external data stores may be identified as being capable of verifying particular values provided from the client device. These three external data stores would then form the subset of external data stores that are capable of handling requests to verify values in the client data set. Therefore, the source selection process 706 may receive a request and determine which one of the subset of external data stores should be used to handle this particular request based on a number of different factors.

In some embodiments, the source selection process 706 can first use a request history to select from the subset of external data stores. For example, a selection process 706 can determine whether the received request is a new request (1002). If this is not the first time a request of this particular type has been received for this particular user, then a determination can be made that this request should use the same selected external data store that was used to process a previous request from this user (1004). This can help leverage the use of previously received external data to handle requests, and can present consistent and uniform responses to the requesting system between requests. On the other hand, if this is a new request (e.g., a request of this type has been received before for this user/identifier), then the source selection process 706 can proceed to use additional factors to select from the subset of external data stores.

In some embodiments, the source selection process 706 can also use the identity of a requesting system to select from the subset of external data stores. For example, specific requesting systems may be obligated or assigned to use specific external data stores. For each such relationship between a specific requesting system and a specific external data store, the source selection process 706 can determine whether the incoming request was received from any such requesting systems, and then assign the request to the corresponding external data store. In the example of FIG. 10, if the request is determined to have originated from a first requesting system (1006), then a first external data store can be selected (1008). This process may iterate through each assigned requesting system (1010), and may make an assignment to a corresponding external data store (1012) when a match is found.

If the requesting system is not assigned to a specific external data store, then the source selection process 706 can make a determination as to which specific external data store the request should be assigned using, for example, the thresholds 708. As will be described below, the source selection process 706 can access the real-time thresholds 708 (1014) and then use an external-source threshold-balancing algorithm (1016) to select one of the subset of external data stores 622 handle the request.

Figure 11:
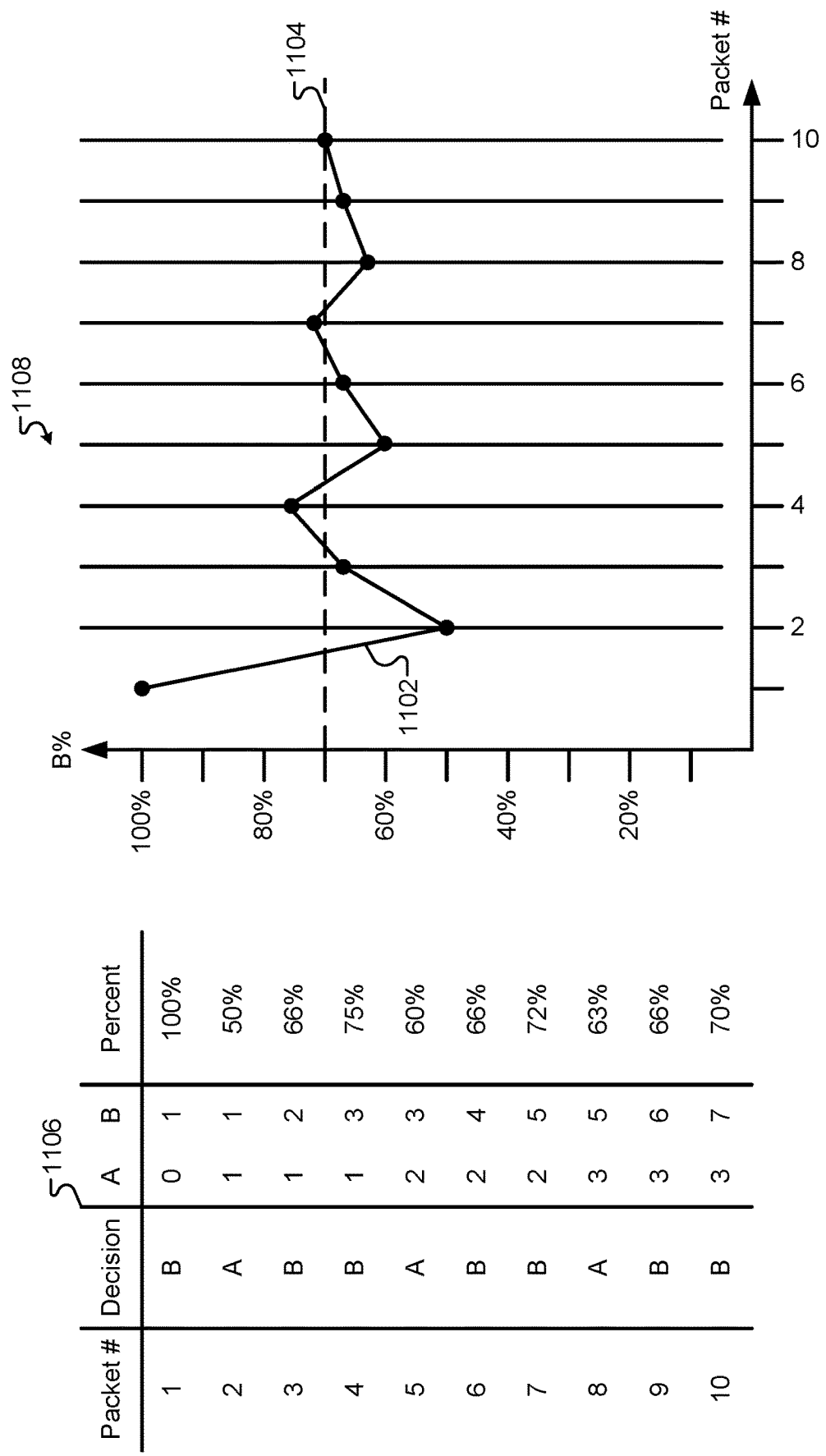
FIG. 11 illustrates an example of how the threshold-balancing algorithm can be executed, according to some embodiments.

FIG. 11 illustrates an example of how the threshold-balancing algorithm can be executed, according to some embodiments. Threshold percentages can be assigned to each of the subset of external data stores that can handle the request. In this simplified example of FIG. 11, the subset of external data stores includes two external data stores, labeled A and B. External data store A has been assigned target threshold percentage of 30%, while external data store B has been assigned a target threshold percentage of 70%, meaning that approximately 70% of all traffic should be routed to external data store B, while only 30% should be routed to external data store A.

As each subsequent request is received, the algorithm can determine which of the two external data stores is farthest away from the target percentage. For example, when the first packet is received and both data stores are at 0%, the decision can be made to route the first packet to external data store B, because it is farthest away from its target of 70%. When the second packet is received, the decision can be made to route the request to external data store A because while both data stores A and B are 30% away from their target thresholds, sending the second packet to external data store A when move both data stores closer to their threshold percentages. This process can continue as illustrated in table 1106 of FIG. 11.

Graph 1108 in FIG. 11 illustrates how this algorithm can oscillate back-and-forth around the target percentage for each external data store like an overdamped control system response. One of the advantages of this algorithm is that it ensures rapid convergence around the thresholds for each external data store. Curve 1102 shows how the values oscillate and eventually converge towards the 70% threshold 1104 for external data store B. Prior to this disclosure, systems could use a random number generator to randomly assign incoming requests to different external data stores based on their percentages. However, while using a random number generator is much faster and simpler than the algorithm proposed above, it does not converge as quickly. Specifically, a large number of random assignments could cause aberrations in the assignments that, although corrected over time with a large number of requests, could momentarily result in assignments that appear to move away from these thresholds. When these threshold requirements, for example, come from an SLA or other similar obligation, even momentarily deviating from convergence towards these threshold percentages can be problematic. Specifically, this algorithm prevents any assignment from being made that does not converge towards the threshold percentages.

The algorithm proposed above ensures that each new request results in assignments that converge towards the threshold percentages.

This balancing algorithm can be expanded to any number of external data stores. For each request received, the algorithm can make an assignment by determining which external data store is farthest from its target percentage, and in the case of ties, determining which assignment between the tied external data stores will minimize the overall deviation from the target thresholds the most. In some embodiments, the decision can be made by comparing a sum of squares of the deviation from each threshold and making an assignment that minimizes the sum of squares expression. Other similar techniques may also be used to make assignments that converge the system in a similar manner.

Figure 12:
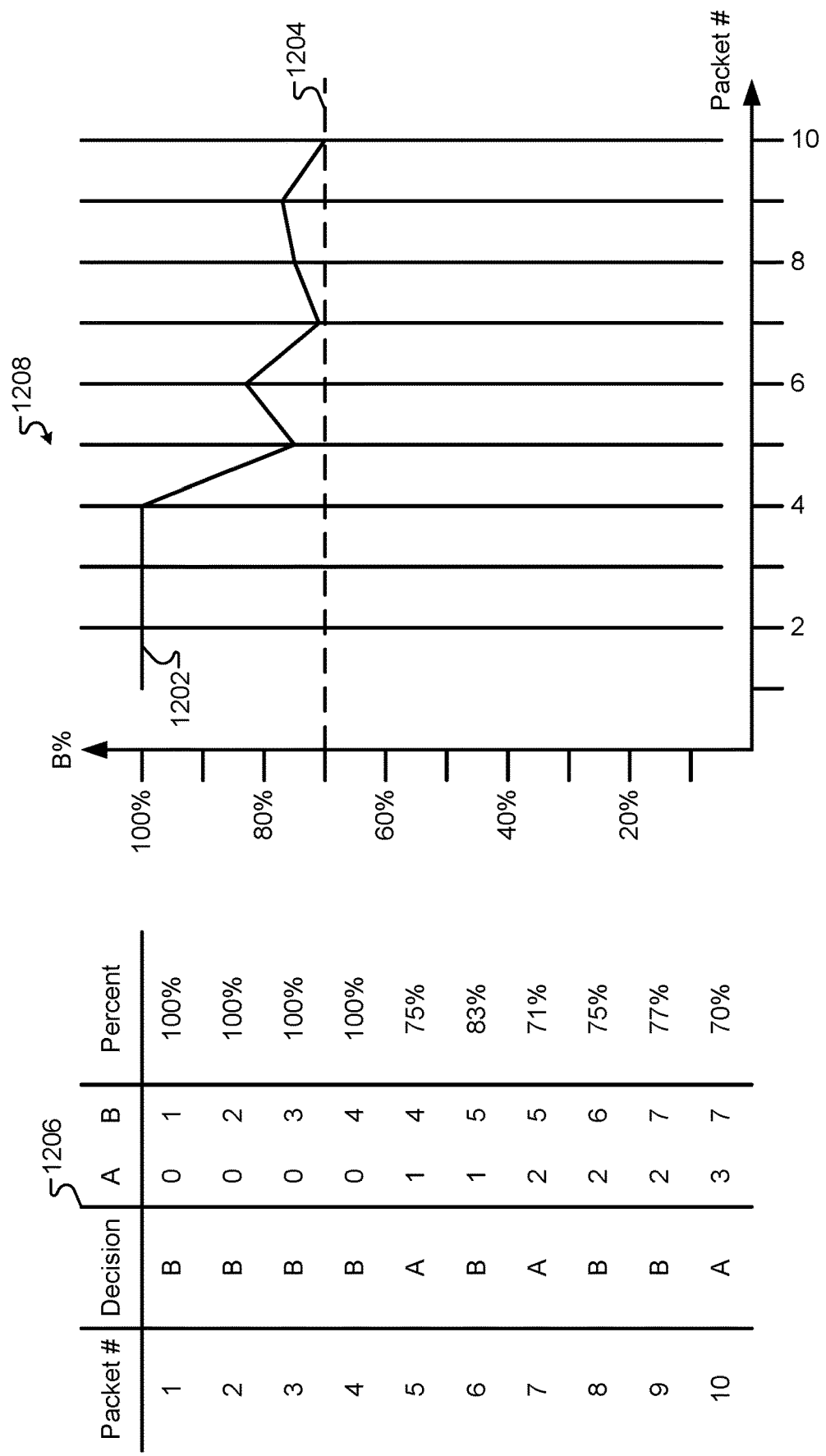
FIG. 12 illustrates an example of how the threshold balancing algorithm can use minimum/maximum thresholds to route request traffic, according to some embodiments.

In some embodiments, the threshold may be specified not only as targets, but also as minimums/maximums. For example, an SLA may specify that a specific external data store must receive a minimum of 70% of all assigned request traffic. FIG. 12 illustrates an example of how the threshold balancing algorithm can use minimum/maximum thresholds to route request traffic, according to some embodiments. In this example, external data store B may be assigned a minimum threshold of 70%. As requests are received, the algorithm can route traffic to external data store B such that its overall percentage never falls below its target threshold. As the first four packets are received in table 1206, each of these will be routed to external data store B because doing otherwise would result in its overall percentage dropping below the threshold 70%. However, the fifth packet can be assigned to external data store A, while the sixth packet would again be assigned to external data store B. As illustrated by graph 1208, the percentage curve 1202 never falls below the threshold 1204. The algorithm can make these determinations as described above in FIG. 11, while adding in the additional constraints to the solution space for each minimum/maximum in the thresholds. Note that more complex thresholds may also be used, including threshold ranges and complex expressions. For example, some embodiments may specify that a particular external data store can only be between 10%-25% or 65%-85% depending on a time of day.

In some embodiments, the algorithm may force a reset of the count of how requests are routed to each external data store. For example, after 1000, 5000, 10,000, 20,000, etc., requests, the system may reset its internal counters and start each percentage over at 0%. Some embodiments may also use a sliding window of requests, such that instead of flushing the entire history, old requests that slide outside of the window would be replaced with new requests. One of the many advantages of this algorithm is that it converges rapidly while still maintaining a balance between different data stores during short intervals. As the number of overall request gets very large, this can result in a long string of consecutive requests being routed to the same external data store. By resetting the counters, the algorithm can again ensure rapid convergence while also ensuring that distribution remains balanced over time.

Some embodiments may also allow the thresholds 708 to be updated dynamically in real-time by the cloud system 106. The balancing algorithm can take a substituted threshold and immediately start rebalancing by calculating differences between actual percentages and threshold percentage by making assignments accordingly. When a threshold is changed, the algorithm may determine that the total number of received requests stored by the counters is high enough that the count should be reset to avoid large consecutive strings of assignments to a single external data store while trying to converge to a new threshold. Some embodiments may reset the counters every time a threshold is changed, or when more than one change to a threshold takes place in a predetermined time interval, or when a threshold changes by more than a predetermineed amount.

In some embodiments, the source selection process 706 can return a prioritized list of external data stores rather than just a single data store. This may be useful when external data stores go off-line. In this case, the external data interface 604 can sequentially move down the prioritized list of external data stores and repackage the request using the corresponding request packaging function 710 and external interface 712 for the next external data store on the prioritized list. However, some embodiments need not adjust the counters in the balancing algorithm described above when the failover occurs between external data stores. Instead, the original assignment to the first data store on the prioritized list of external data stores would receive "credit" for servicing a request in the balancing algorithm, even if the first data store failed and another data store on the prioritized list actually serviced the request. This prevents a run-away process where an online external data store receives all of the network traffic while the other external data stores off-line, then the other external data store receives all traffic once it comes back online to make up the difference. By not updating the counters when the failover occurs, the balancing algorithm ensures that traffic is evenly routed between external data stores after the failed external data store comes back online.

Figure 13:
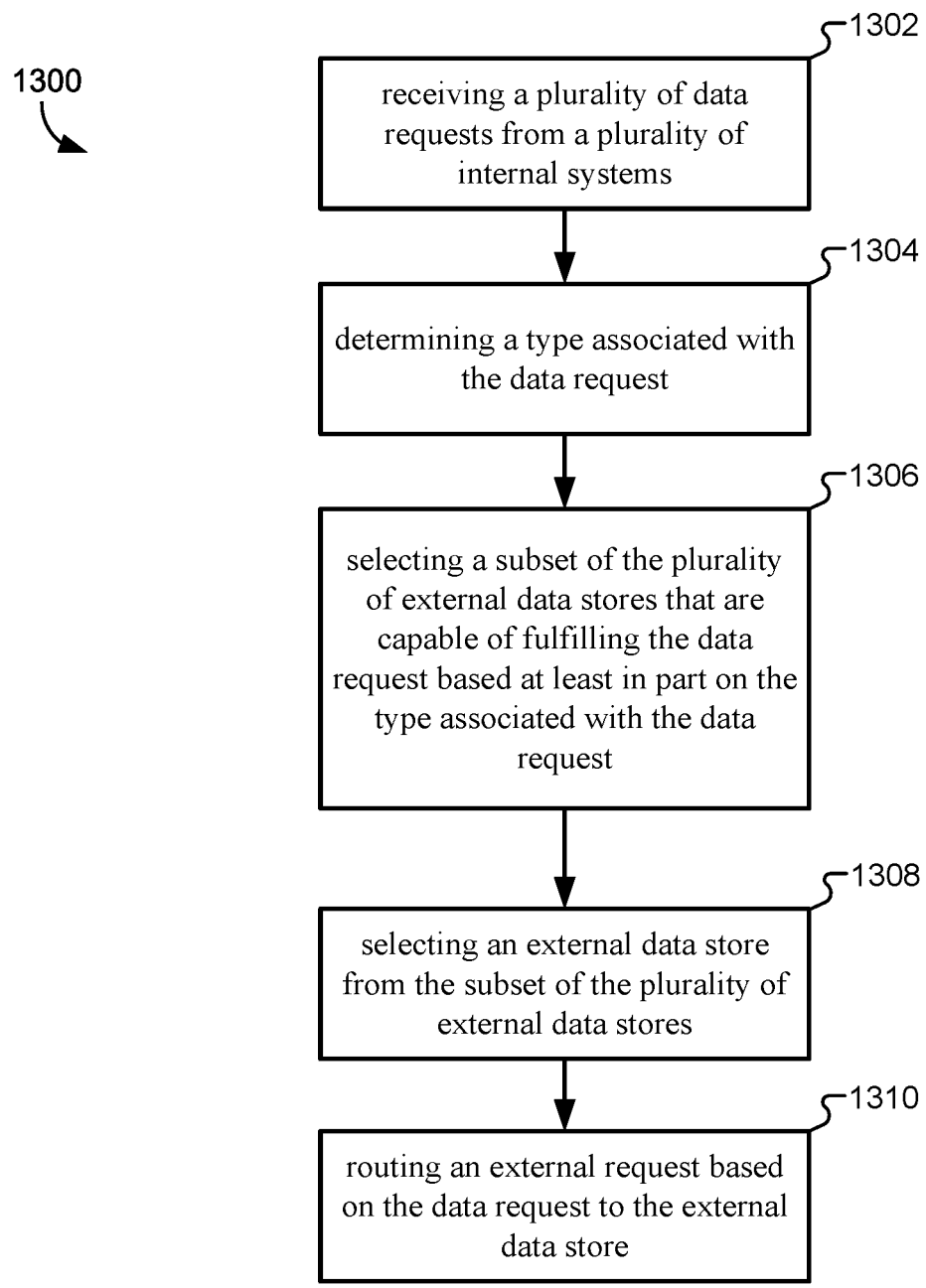
FIG. 13 illustrates a flowchart of a method for routing requests from a plurality of internal systems between a plurality of external data stores, according to some embodiments.

FIG. 13 illustrates a flowchart 1300 of a method for routing requests from a plurality of internal systems between a plurality of external data stores, according to some embodiments. The method may include receiving a plurality of data requests from a plurality of internal systems (1302). The internal systems may be part of a cloud computing system or may be operated by a common entity. The requests may be for a plurality of external data stores, such as external Web services or external APIs that provide data or store data that can be returned to the cloud platform. For example, one of the internal systems may comprise a Web server operated by the cloud computing platform. The internal systems and/or the cloud computing platform may be separate and distinct computing systems from any of the external data stores. For example, the external data stores may only be accessible to the internal systems and/or the cloud computing platform over the Internet. The internal systems and/or the cloud computing platform can be operated in separate facilities from the external data stores, and may be remotely located such as at least 10 miles apart, 25 miles apart, 50 miles apart, and/or 100 miles apart.

The method may further include determining a type associated with the data request (1304). The cloud computing platform may further include an API having one or more function calls, where each function call is associated with a particular subset of the plurality of external data stores that are capable of fulfilling the request. The type may be determined based on the function call received through the API. The method may additionally include selecting a subset of the plurality of external data stores that are capable of fulfilling the data request based at least in part on the type associated with the data request (1306). The cloud computing system may include a first cache that stores external data previously received from the plurality of external data stores in response to data requests. The cloud computing system may also include a second cache that stores personal identification information or other information used to build requests.

The method may further include selecting an external data store from the subset of the plurality of external data stores (1308). The selection may be made based on a number of factors, including an identity of an internal system in the plurality of internal systems from which the data request was received. The selection may also be based on one or more thresholds associated with the subset of the plurality of external data stores. The thresholds may include a target threshold for each of the subset of the plurality of external data stores that defines a percentage of overall request traffic it should be routed thereto. The method may also include determining a request traffic percentage for the external data store deviates more from its associated target threshold than others of the subset of the plurality of external data stores; and selecting the external data store that the current request traffic percentage for the external data store deviates more from its associated target threshold. In some embodiments, the threshold may be changed dynamically, in real-time, such that any change in the threshold can result in a rebalancing between the plurality of external data stores. When thresholds are changed or when an upper threshold is reached, counters associated with the selection process can be reset. The method may also include routing an external request based on the data request to the external data store (1310).

Figure 14:
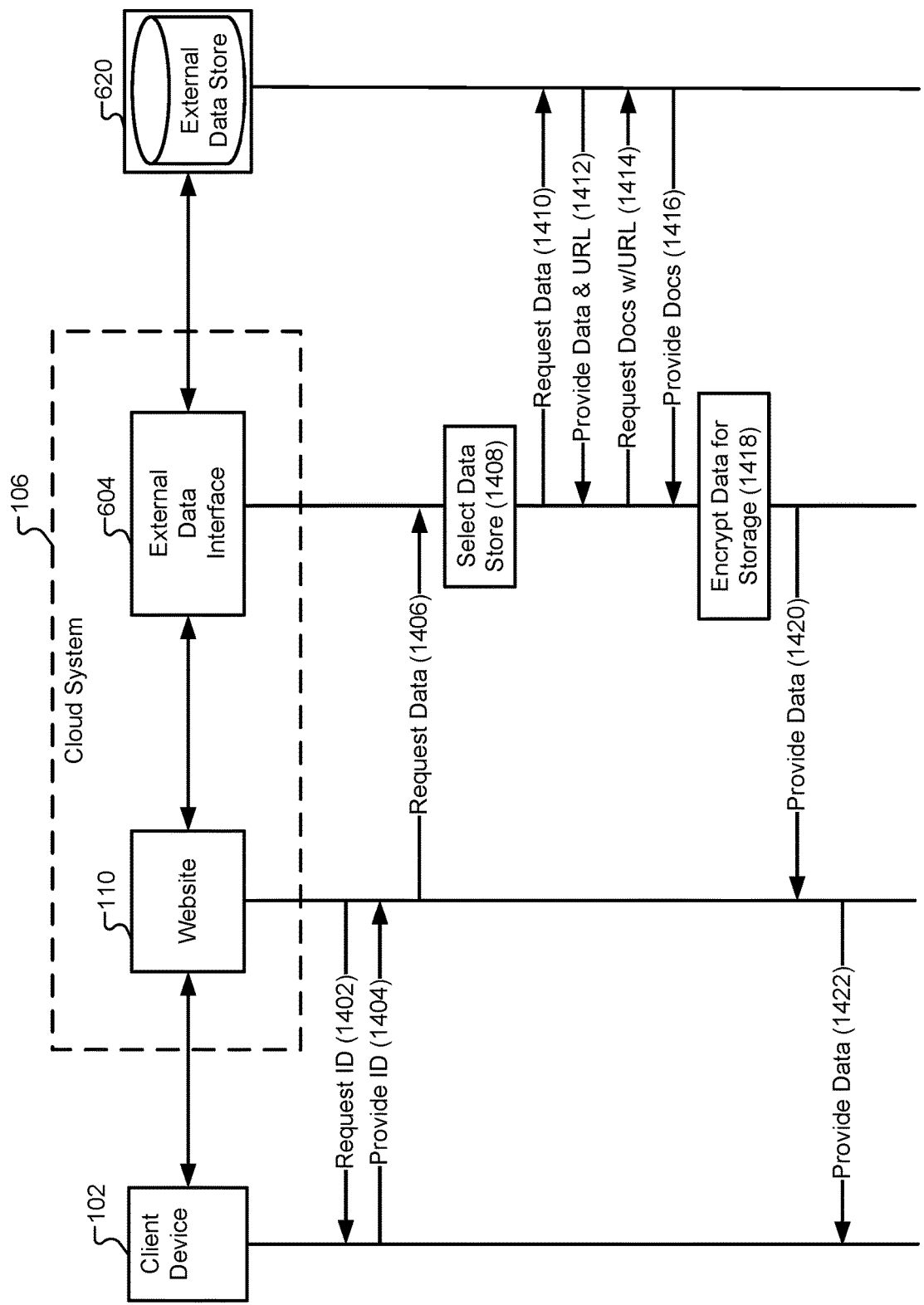
FIG. 14 illustrates a flow diagram of a transaction for requesting and verifying data for a client device, according to some embodiments.
Figure 15:
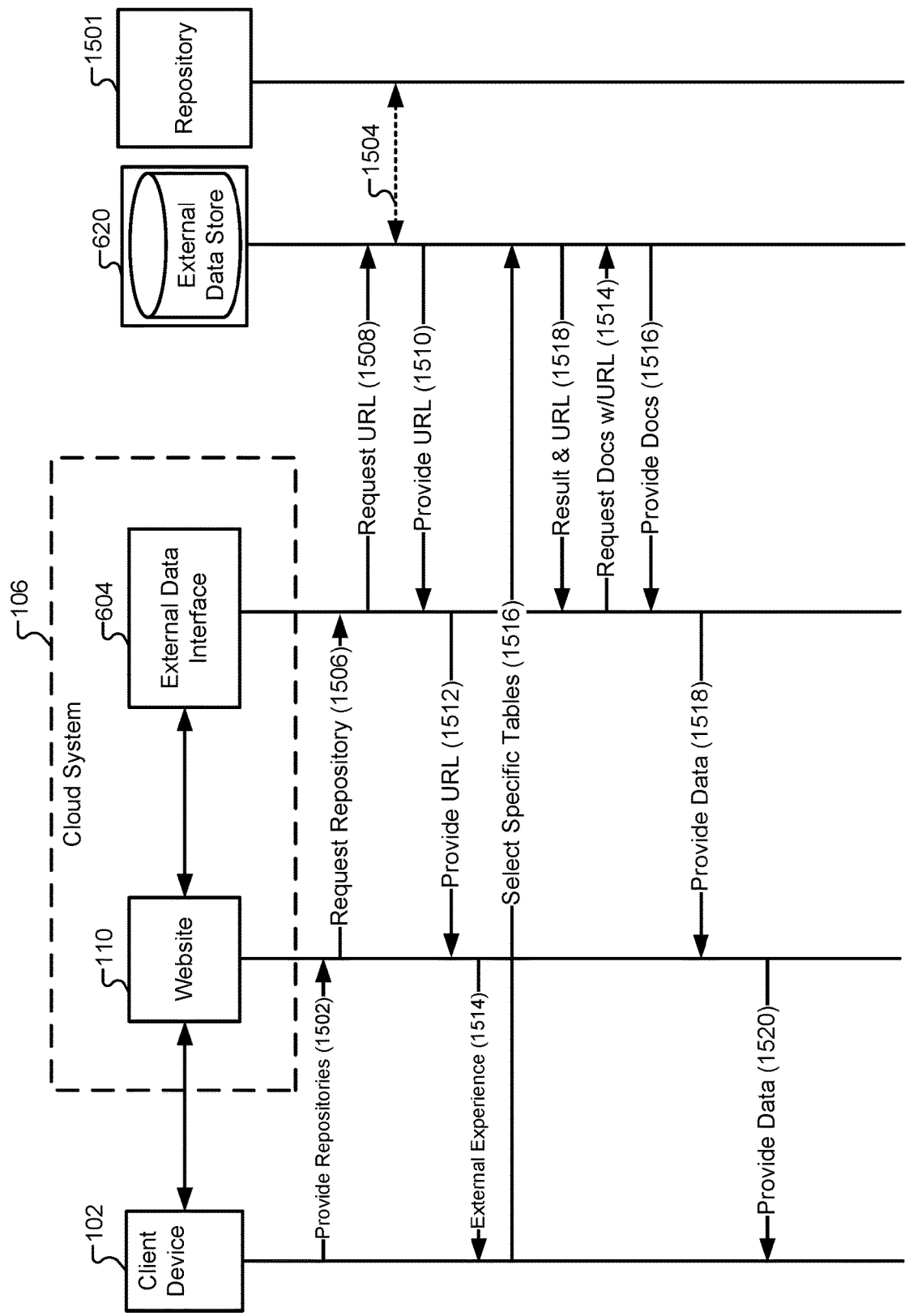
FIG. 15 illustrates a flow diagram of another process for requesting data from an external data store, according to some embodiments.

As described above, the external data stores can be used to extract a variety of different data types, which can be used in a number of different ways for analyzing, verifying, supplementing, and correcting input received from the client device. FIGS. 14-15 illustrate two examples of how the external data interface 604 can receive a request from an example website and retrieve information from an external data store. It can be assumed that the request was handled, built, and cached as described above, and that the balancing algorithm described above was used to select the external data store.

FIG. 14 illustrates a flow diagram of a transaction for requesting and verifying data for a client device, according to some embodiments. The website 110 can provide a web interface to a client device 102 and request information to uniquely identify the user (1402). This request may be sent in response to a user selecting an input control indicating that they would like the cloud system to automatically import data from an external data store 604. The user can populate the web form and provide identifying information to the website 110 (1404). The website 110 can then format the request according to the requirements of the API of the external data interface 604, which can then send the formatted request to the external data interface 604 (1406).

The external data interface 604 can select among the various available external data stores 620 to select an external data store as described above (1408). In some embodiments, the external data store 620 may be selected based on response time, accuracy, availability, and/or other factors that affect the performance of the external data interface 604. One goal of the inventions described herein is to provide a rapid response process, and these embodiments may prefer external data stores that can provide accurate information the fastest in order to streamline the process for the user. Some embodiments may also examine the contents of the request itself to select an external data store that has the information for the particular user available.

After selecting an external data store 620, the data set management system 404 can send the request to the external data store 620 (1410). As described above, the external data interface 604 can use one of the interfaces that is designed specifically to interface with the selected external data store 620. The external data store 620 can provide a responsive transmission that includes a number of different data fields (1412). The external data store 620 may also provide a status of the verification request. For example, some embodiments may send a value provided by the client device 102 to be verified by the external data store 620. The external data store 620 can respond with a success/failure reply that indicates whether the value provided by the client device 102 could be verified.

In some embodiments, the external data store 620 can additionally provide a URL that provides access to documents that can be used to support the data and/or verifications provided by the external data store 620. The URL can provide a secure link to the external data interface 604 to download documents (1416). These documents can be encrypted by the external data interface 604 and stored locally and/or sent to the file intake service 608 to be stored at the data center 138 described above (1418).

After receiving the verification from the external data store 620, the external data interface 604 can format the response according to the standard format of the API interface 622 between the external data interface 604 and the website 110. The response can then be sent to the website 110 (1420), and the website can display the data and/or verification results on the client device 102 (1422). The applicant may then be given the opportunity to provide corrections and/or supplemental values that were not available through the external data store 620.

In some embodiments, the external data store 620 can also provide a token with the data/verification and URL (1412). This token can then be passed to other verification services and used internally to download the results for the response. Therefore, these qualification services can retrieve the same information that was provided to the external data interface 604. This ensures that the data provided from the external data store 620 is the same for both the external data interface 604 and the qualification services.

FIG. 15 illustrates a flow diagram of another process for requesting data from an external data store, according to some embodiments. Flow diagram 1500 is similar in nature to the flow diagram of FIG. 14, except instead of providing identifying user information, the client device 102 can provide a designation of one or more data repositories with record of the user's data (1502). The website 110 can format the request according to the API interface 622, and send the request to the external data interface 604 (1506). In some embodiments, the external data interface 604 can also select between various external data stores to select the best external data store 620 from the list as described above.

Instead of interfacing directly with the external data store 620 to retrieve data for the client device 102, the external data store may also interface and provide access to a plurality of other data repositories 1501. The external data store 620 maintains an interface with each repository 1501 to provide access to individual data tables therein. However, because the client device typically needs to login and select data tables at the repository to be shared with the external data interface 604, a communication session may be established between the client device 102 and the external data store 620 directly. Therefore, the external data interface 604 can send a request to the external data store 620 to initiate a communication session (1508). The external data store 620 can respond with a URL (1510). The external data interface 604 can pass the URL to the web site 110 (1512) and the web site 110 and/or client device 102 can execute the URL to provide a link to the external data store 620 (1514).

The communication session between the client device 102 and the external data store 620 can provide a "vendor experience," such that the external data store provides user interfaces and data selection mechanisms that allow the applicant to login to their repository and select data tables that should be shared with the external data interface 604 (1516). In some embodiments, the steps can be repeated by the applicant for numerous tables within the same repository 1501, numerous tables available across different repositories, and/or numerous tables available through different external data stores 620.

When the applicant finishes selecting accounts that should be shared with the external data interface 604, the communication session can be terminated. In response, the external data store 620 can send results and/or a URL to the external data interface 604 (1518). The external data interface 604 can then use the URL to request documents from the external data store 620 (1514), and then provide the documentation to the file intake service 608 for local and/or off-cloud storage. The data can then be provided to the website 110 (1518) and displayed on the client device 102 for the user (1520).

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A system for routing data requests from internal systems to external data stores, the system comprising:
a plurality of internal systems that generate a plurality of data requests to be routed to a plurality of external data stores;
a cloud computing platform comprising one or more processors that are configured to:
receive the plurality of data requests from the plurality of internal systems; and
for each of the plurality of data requests received from the plurality of internal systems:
determine a type associated with the data request;
select a subset of the plurality of external data stores that are capable of fulfilling the data request based at least in part on the type associated with the data request;
select an external data store from the subset of the plurality of external data stores, wherein the external data store is selected based at least in part on:
an identity of an internal system in the plurality of internal systems from which the data request was received; and
one or more thresholds associated with the subset of the plurality of external data stores; and
route an external request based on the data request to the external data store.

2. The system of claim 1, wherein the cloud computing platform further comprises a first cache comprising external data previously received from the plurality of external data stores in response to data requests.

3. The system of claim 2, wherein the one or more processors of the cloud computing platform are further configured to, for each of the plurality of data requests received from the plurality of internal systems:
  receive a response comprising external data in response to the data request;
  generate a response based on the external data;
  send the response to the internal system in the plurality of internal systems from which the data request is received; and
  store the external data in the first cache.

4. The system of claim 2, wherein the one or more processors of the cloud computing platform are further configured to, for each of the plurality of data requests received from the plurality of internal systems:
  receive a second data request from one of the plurality of internal systems;
  determine whether the second data request can be serviced using the external data previously received in the first cache; and
  if the second data request can be serviced using the external data previously received in the first cache, generate a response based on the external data previously received in the first cache without sending a request to the plurality of external data stores.

5. The system of claim 1, wherein the cloud computing platform further comprises a second cache comprising information used to build a request to the plurality of external data stores.

6. The system of claim 5, wherein the one or more processors of the cloud computing platform are further configured to, for each of the plurality of data requests received from the plurality of internal systems:
  determine that the data request does not include all the information needed to generate the external request for the external data store;
  extract an identifier from the data request;
  retrieve the information needed to generate the external request from the second cache using the identifier; and
  generate the external request using the information needed to generate the external request retrieved from the second cache.

7. The system of claim 5, wherein the one or more processors of the cloud computing platform are further configured to, for each of the plurality of data requests received from the plurality of internal systems:
  determine that the data request includes all the information needed to generate the external request to the external data store; and
  send the information needed to generate the external request to the second cache.

8. The system of claim 1, wherein the cloud computing platform further comprises an API comprising one or more function calls that are associated with the subset of the plurality of external data stores that are capable of fulfilling the data request.

9. The system of claim 8, wherein the type associated with the data request is determined based on the one or more function calls received through the API.

10. The system of claim 1, wherein the plurality of internal systems comprises a Web server.

11. A method for routing data requests from internal systems to external data stores, the system comprising:
  receiving, at a cloud computing platform, a plurality of data requests from a plurality of internal systems; and
  for each of the plurality of data requests received from the plurality of internal systems:
    determining a type associated with the data request;
    selecting a subset of the plurality of external data stores that are capable of fulfilling the data request based at least in part on the type associated with the data request;
    selecting an external data store from the subset of the plurality of external data stores, wherein the external data store is selected based at least in part on:
      an identity of an internal system in the plurality of internal systems from which the data request was received; and
      one or more thresholds associated with the subset of the plurality of external data stores; and
    routing an external request based on the data request to the external data store.

12. The method of claim 11, wherein each of the plurality of external data stores is operated on a computer system that located in a separate facility from the cloud computing platform and the plurality of internal systems, and wherein each of the plurality of external data stores is accessed by the cloud computing platform over the Internet.

13. The method of claim 11, wherein the one or more thresholds associated with the subset of the plurality of external data stores comprises: a target threshold for each of the subset of the plurality of external data stores defining a percentage of overall request traffic to be routed to each of the subset of the plurality of external data stores.

14. The method of claim 13, wherein selecting an external data store from the subset of the plurality of external data stores comprises:
  determining that a current request traffic percentage for the external data store deviates more from its associated target threshold than others of the subset of the plurality of external data stores; and
  selecting the external data store that the current request traffic percentage for the external data store deviates more from its associated target threshold.

15. The method of claim 11, further comprising:
  determining that a size of the plurality of data requests is exceed a threshold; and
  in response, resetting one or more characters that are used to select the external data store from the subset of the plurality of external data stores.

16. The method of claim 11, wherein the cloud computing platform further comprises a first cache comprising external data previously received from the plurality of external data stores in response to data requests.

17. The method of claim 16, further comprising, for each of the plurality of data requests received from the plurality of internal systems:
  receiving a response comprising external data in response to the data request;
  generating a response based on the external data;
  sending the response to the internal system in the plurality of internal systems from which the data request is received; and
  storing the external data in the first cache.

18. The method of claim 11, further comprising, receiving dynamic changes to the one or more thresholds, and rebalancing request traffic between the plurality of external data stores.

19. The method of claim 11, wherein the cloud computing platform further comprises a second cache comprising information used to build a request to the plurality of external data stores.

20. The method of claim 19, further comprising, for each of the plurality of data requests received from the plurality of internal systems:

determining that the data request does not include all the information needed to generate the external request for the external data store;
extracting an identifier from the data request;
retrieving the information needed to generate the external request from the second cache using the identifier; and
generating the external request using the information needed to generate the external request retrieved from the second cache.

\* \* \* \* \*